United States Patent
Serebrennikov et al.

(10) Patent No.: US 6,997,075 B2
(45) Date of Patent: Feb. 14, 2006

(54) MOTOR VEHICLE WITH A GEARBOX AND METHOD FOR OPERATING A MOTOR VEHICLE

(75) Inventors: Boris Serebrennikov, Buhl (DE); Klaus Henneberger, Buhl (DE); Martin Eckert, Gorwihl (DE); Frank Bast, Kurnbach (DE); Reinhard Berger, Buhl (DE); Martin Vornehm, Buhl (DE); Stefan Winkelmann, Buhl (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/418,742

(22) Filed: Apr. 17, 2003

(65) Prior Publication Data

US 2004/0077457 A1 Apr. 22, 2004

Related U.S. Application Data

(63) Continuation of application No. PCT/DE01/03735, filed on Sep. 28, 2001.

(30) Foreign Application Priority Data

| Oct. 20, 2000 | (DE) | ................................ 100 52 297 |
| Nov. 22, 2000 | (DE) | ................................ 100 58 125 |
| Dec. 12, 2000 | (DE) | ................................ 100 61 813 |

(51) Int. Cl.
*F16H 3/38* (2006.01)

(52) U.S. Cl. ...................... 74/339; 74/336 R
(58) Field of Classification Search .................. 74/329, 74/331, 333, 335, 336 R, 339

See application file for complete search history.

(56) References Cited

U.S. PATENT DOCUMENTS

| 4,847,767 A | | 7/1989 | Carton et al. |
| 4,856,361 A | * | 8/1989 | Shinmoto ..................... 74/339 |
| 5,603,242 A | * | 2/1997 | Krieger ....................... 74/335 |
| 6,065,360 A | * | 5/2000 | Hollingsworth et al. ...... 74/335 |
| 6,070,117 A | | 5/2000 | Yamada et al. |
| 6,276,224 B1 | * | 8/2001 | Ueda et al. .................... 74/335 |
| 6,393,928 B1 | * | 5/2002 | Watanabe ................. 74/336 R |

FOREIGN PATENT DOCUMENTS

| DE | 34 11 092 A1 | 5/1985 |
| DE | 34 11 239 A1 | 5/1985 |
| DE | 34 18 671 A1 | 5/1985 |
| DE | 36 28 774 A1 | 4/1987 |
| DE | 36 30 398 A1 | 5/1987 |
| DE | 37 21 712 A1 | 1/1988 |

(Continued)

OTHER PUBLICATIONS

Derwent WPI, DE 34 11 092 A, May 23,1985, "Engine Torsional Vibration Damper- Has Flywheel Boss Supported in Bearing From Engine".

*Primary Examiner*—Ha Ho
(74) *Attorney, Agent, or Firm*—Darby & Darby

(57) ABSTRACT

In a motor vehicle transmission, gears representing different transmission ratios are engaged by applying a force to an actuator output element that couples a selected gear to a rotary shaft. A synchronizing device blocks the coupling of the gear to the shaft until at least an approximate synchronization of rpm-rates has been achieved. A synchronization threshold position corresponding to the blocked condition of the actuator element is stored in a memory of a controller device. The controller device periodically performs an automatic adaptation of the stored value for the synchronization threshold position.

25 Claims, 10 Drawing Sheets

FOREIGN PATENT DOCUMENTS

Figure 1:
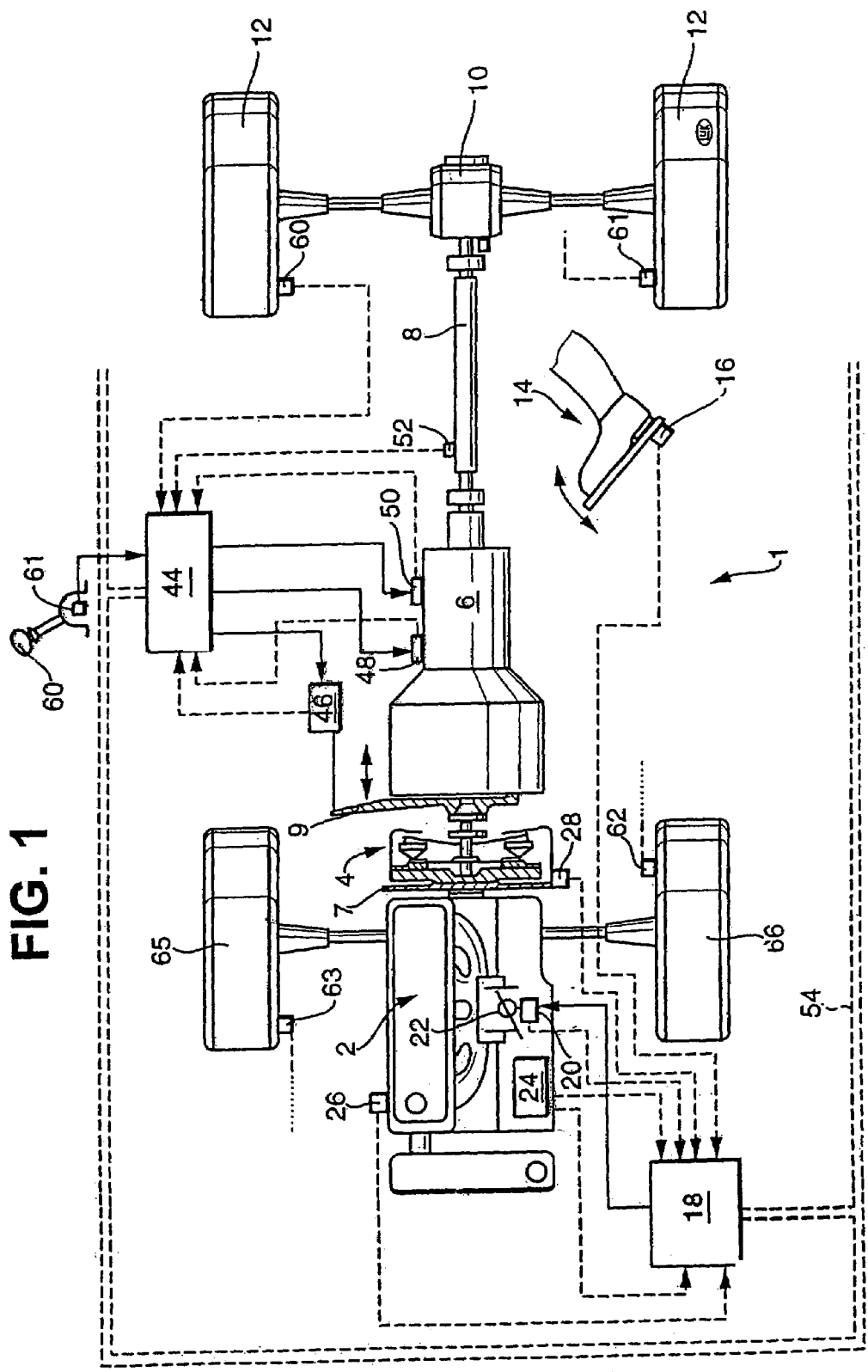

| | | |
|---|---|---|
| DE | 42 39 289 A1 | 5/1993 |
| DE | 42 39 291 A1 | 5/1993 |
| DE | 197 13 423 A1 | 11/1997 |
| DE | 197 34 023 A1 | 2/1998 |
| DE | 43 06 505 A1 | 9/1998 |
| EP | 0 310 387 A2 | 4/1989 |
| EP | 0 579 532 | 8/1996 |
| EP | 0 695 892 B1 | 5/2000 |
| GB | 2 315 526 A1 | 2/1998 |
| JP | 04-19462 * | 1/1992 |

* cited by examiner

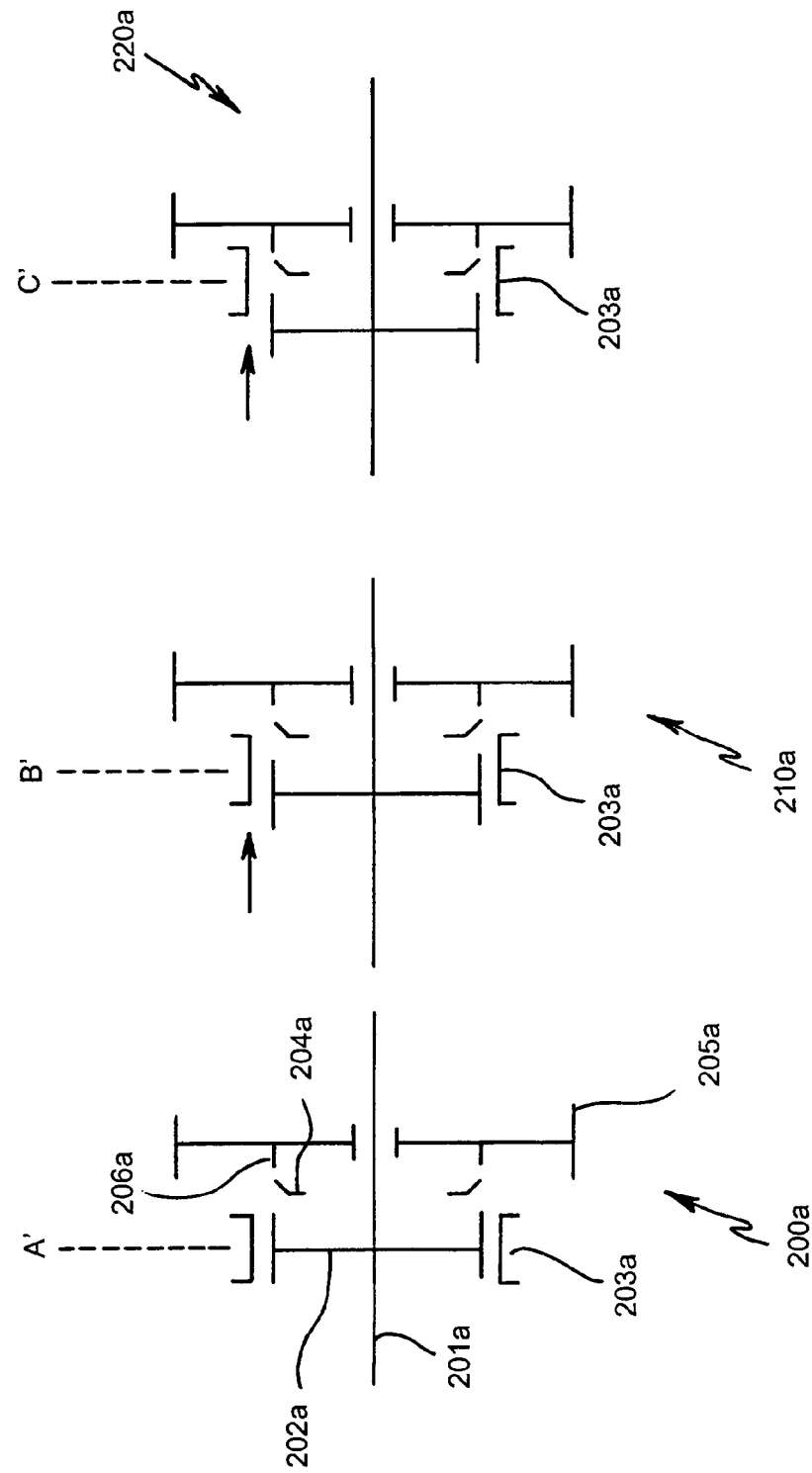

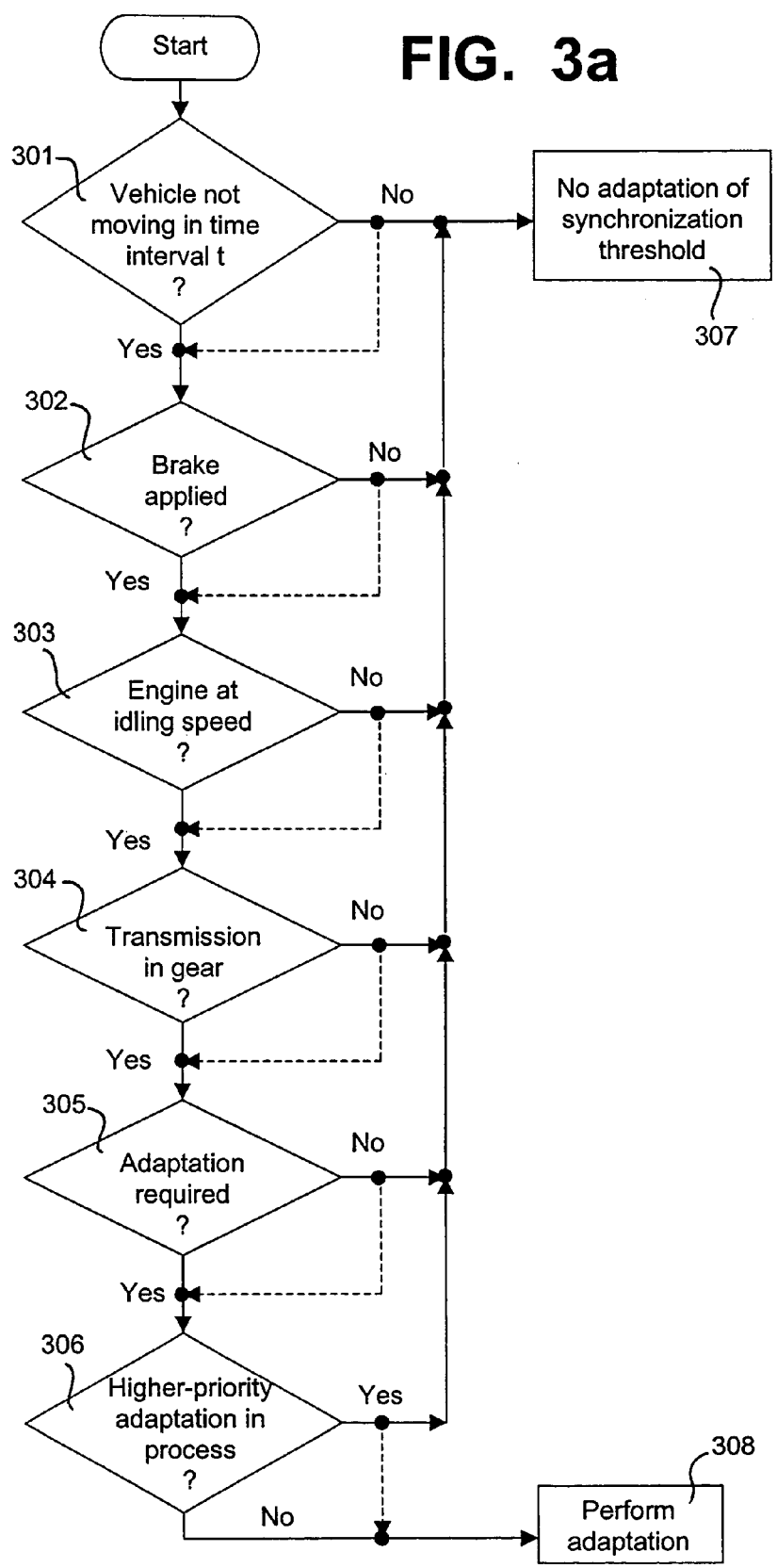

US 6,997,075 B2

MOTOR VEHICLE WITH A GEARBOX AND METHOD FOR OPERATING A MOTOR VEHICLE

CROSS-REFERENCE TO RELATED APPLICATION

This application is a continuation of International patent application Ser. No. PCT/DE01/03735 filed Sep. 28, 2001, which is hereby incorporated by reference in its entirety.

TECHNICAL FIELD

The invention relates to a motor vehicle with an engine, a torque-transmitting device with a first actuating device, and a transmission that has an input shaft and an output shaft and a second actuating device. The transmission has a plurality of gear pairs that form a stepwise series of gear ratios, where each ratio step has a fixed gear that is solidly connected to a shaft and a free gear that has a selectively engageable and disengageable connection to a shaft. The motor vehicle further has a control device whereby the first and second actuating devices can be controlled in an automated mode initiated by the control device. The invention also relates to a method of operating a motor vehicle.

BACKGROUND

In a motor vehicle of this type, a gear ratio is engaged by connecting the free gear of the respective ratio to the shaft on which that gear is supported. To allow the engagement to take place, the difference in rpm-rates of the rotating parts to be engaged to each other should be at least near zero. The process of establishing the at least approximate equality between the rpm-rates is called synchronization.

There is for example a type of transmission where the synchronization devices connected to each of the free gears will at least approximately equalize the rpm-rates of the parts that are to be coupled to each other during a gear shift and will not allow the complete engagement of the respective gear clutch until the rpm-rates have become at least approximately equal. In the initial phase of a gear shift, the parts to be coupled are first put into contact with each other through a friction surface, so that a frictional drag occurs between the parts dependent on the engagement force and the friction coefficient. The synchronizing device can further include a blocking device that prevents a further engagement as long as the frictional drag torque is present. At the point where the rpm-rates are almost equalized, so that that there is at least close to no frictional traction transmitted between the parts, the blocking device releases its hold and the gear-shifting process can be finished by moving the two parts into form-locking engagement with each other. The position where the further engagement is blocked by the blocking device as long as the rpm-rates are not sufficiently synchronized is referred to as the synchronizing position. There is also another type of transmissions that work without synchronization devices of the foregoing description. The function of delaying the form-locking engagement until approximate equality of the rpm-rates has been attained is performed in another way, for example through a suitable control of the engine or through brakes on the rotary shafts. The rpm-difference is in this case determined by appropriate sensors.

The term "automated shift transmission" as used herein refers to transmissions in which a synchronized shift process according to the foregoing description can be performed automatically. The automated actuation of the gear shift is initiated automatically by the control device based on a number of input quantities. The control of the synchronization in particular represents a very complex and challenging problem. For example, at the synchronization threshold, i.e., at the point of a synchronized gear engagement where the aforementioned blocking device stops the sliding sleeve of the shift clutch from advancing further, there should be a predetermined amount of actuating force acting on the sleeve. This particular amount of force is also referred to as the synchronization force. To enable the control device to set this specific amount of force, the position of the synchronization threshold has to be determined with sufficient accuracy, and/or there has to be a way of setting the synchronization force that is independent of an exactly defined position of the synchronization threshold. To complete the gear shifts in a short time interval in an optimized shift process, it is further of critical importance how the synchronization force is built up and set to the predetermined magnitude, in a manner that takes the relevant parameters into account with a sufficient level of accuracy.

A gear-shifting concept involving the use of elasticity is known per se, for example from the European patent EP 579 532 B1. The elasticity is in this case provided by an auxiliary mechanism for the engagement of the gears in a transmission that is shifted by means of cables or rod linkages, where the shift sequence is transmitted through a shift-controller shaft whose rotary movements are driven by a cable or rod. A mechanical connection between the cable or rod and the shaft consists of two pivoted parts whose movements relative to each other are elastically controlled by a spring that stores energy by being compressed during the synchronization phase and subsequently releases the stored energy. The auxiliary mechanism is intended to remove certain drawbacks of conventional gear-shifting devices, specifically the duration of the synchronization time interval that is perceived as too long, or the long free travel of the shift movement, the considerable force required to transmit the shifting action which manifests itself through slowness of the synchronization, and the tactile feeling of shifting noise from the meshing of the gear teeth which is felt as annoying. The auxiliary mechanism described in this reference relates to manually shifted transmissions.

Another reference, EP 695 892 B1, relates to a transmission-shifting system with at least one actuator device as well as sliding sleeves actuated by the device, where the connecting mechanism includes a spring. The transmission as disclosed prevents excessive current levels in the electric motor of the actuator in cases where a gear shift cannot take place immediately. The transmission-shifting system disclosed is an automated shift transmission in the sense of the foregoing definition.

The elastic shift arrangement disclosed in EP 579 532 B1 performs the function of an energy collector by being compressed at certain times and subsequently expanding again. In this manner, the sliding sleeve receives a stronger impulse from the spring than the impulse that could be transmitted to the clutch if the driver performed a fast shift lever movement. The resultant impulse is always dependent on the speed or force that the driver applies to the shift lever, while the precise setting of the required target force at the sliding sleeve is more or less left to chance.

The elastic shifting concept disclosed in EP 695 892 B1 likewise follows the concept of storing energy during a shift process through compression and subsequently releasing the stored energy. The resulting shift elasticity in this case allows the shifter sleeve to follow the actuator movement with a time delay to allow for synchronization to take place. The elastic shift behavior protects the electric motor against overload, but it is not possible to influence the target force level on the sliding sleeve through the speed of the shift lever movement, taking the shift elasticity into account.

The system between the sliding sleeve and the actuator drive source with the connecting mechanism and its kinematic and elastic properties has a high degree of complexity, particularly in the case of automated shift transmissions. So far, no satisfactory solution has been found for performing a synchronized gear shift that meets the multitude of requirements, particularly on how to control the speed of gear engagement while taking into account the elastic characteristics of the mechanism between the actuator drive source and the sliding sleeve.

SUMMARY

The objective of the present invention is to improve the way in which the synchronization process runs in a vehicle of the kind described above so that, among other benefits of the invention, the shift process can be performed more comfortably, faster, and with less wear.

As a further objective, the invention aims to provide a transmission as well as a method of operating a transmission in which the synchronized change from one transmission ratio to another is significantly improved in particular with regard to the build-up of the synchronizing force at the synchronization threshold by taking the kinematic and elastic properties of the mechanism into account.

According to the invention, the foregoing objectives are achieved in a vehicle of the kind described above, where the transmission of the vehicle employs a plurality of features or process steps according to the following description with the accompanying drawing figures as well as the claims. The desired successful results are obtained in particular from the combination of features as presented herein, but a beneficial effect is also gained from each of the individual features by itself.

The invention offers a solution to meet one aspect of the foregoing objective in a motor vehicle with an engine, a torque-transmitting device with a first actuating device, a transmission with an input shaft and an output shaft and a second actuating device, wherein the transmission has a plurality of gear pairs for the ratio steps of the transmission. Each gear pair has a fixed gear that is permanently connected to a shaft, and a free gear that is selectively connectable to another shaft. The vehicle further has a control device that controls the actuation of the first and second actuating devices. In a first operating mode of the control device, the control device initiates the actuation automatically on the basis of a plurality of input quantities. In a second operating mode, the actuation is initiated through an input given by the driver of the vehicle. In at least one of the ratio steps, the aforementioned selective connection of a free gear to its supporting shaft is performed by means of an actuator output element such as a sliding sleeve with a synchronizing device. During the engagement process of the free gear, the actuator output element with the application of a synchronizing force establishes an at least approximate match between the rpm-rates of the elements to be coupled. The move into complete engagement is released only after the synchronization has been completed and the rpm-rates have been at least approximately equalized. According to the invention, the position of the actuator output element at the threshold of engagement (referred to as the synchronization threshold) of at least one of the transmission ratios is stored in a memory of the control device.

The term "actuator output element" as used above refers to the last moving element in the actuating chain by which a transmission ratio is set, i.e., by which two torque-transmitting elements are coupled to each other. Examples are a rotation-reversing gear, a gear block, a sliding sleeve of a shift clutch, and a slave cylinder of a hydraulic clutch.

According to a very advantageous embodiment of the invention, the position of the synchronization threshold of the at least one transmission ratio is adaptable, so that a sufficiently accurate agreement can be ensured between the actual position and the stored position of the synchronization threshold in spite of the fact that the position of the synchronization threshold is subject to change during operation. In a preferred embodiment of the invention, an adaptation of the synchronization threshold is performed when the vehicle is standing still, the engine is running, a vehicle brake is engaged, and a request for the adaptation of the synchronization threshold is present. The adaptation is best performed if the vehicle has been standing still for a preset time interval t and the engine is running at or near its idling speed. This ensures that the adaptation occurs when the difference between the rpm-rates of the parts that are to be coupled by the shift clutch is small, that the torque transmitted to the wheels during the adaptation is small enough that the vehicle will not start to move, and that any shafts that may have been rotating at a high rpm-rate will have been slowed down.

In a vehicle in which transmission ratios are engaged through the second actuating device which includes means for selecting and actuating the manipulating elements of the actuating mechanism, the adaptation of the synchronization threshold is preferably performed by the following steps:

engaging the torque-transmitting device by means of the first actuating device;

by means of the second actuating device, moving a manipulating element into immediate proximity to the transmission-ratio stage whose synchronization threshold position is to be adapted;

beginning at a starting point from which the synchronization threshold will with certainty be traversed, actuating the actuator output mechanism, so that the actuator output element is moved in the direction of its final engaged position; and detecting the synchronization threshold position based on the resistance that is encountered by the actuator output element in its movement towards engagement, which is due to insufficient synchronization.

The second actuating device has two drive mechanisms. One drive mechanism actuates, e.g., the selection among the different sliding sleeves by moving a shift finger into engagement with a shift fork for the actuation of the selected sliding sleeve that is associated with the transmission-ratio stage whose synchronization threshold is to be adapted. In performing an adaptation process, it is practical if the shift finger is first moved to a position in the immediate proximity of the specific ratio stage whose synchronization threshold is to be adapted. Preferably, this first move couples the shift finger to the shift fork that is associated with that specific ratio stage. A second drive mechanism of the second actuating device drives the shift engagement by moving the shift finger in such a manner that the shift fork which is now coupled to the shift finger moves the sliding sleeve into or out of engagement. In performing the adaptation of the synchronization threshold, the movement to engage the sliding sleeve is started at a point from which the synchronization threshold will with certainty be traversed, for example moving from the neutral position of the sliding sleeve up to a position where an adaptation of the synchronization threshold is possible.

In the present context, the term "actuator output mechanism" means a mechanism that includes the actuator output element. The term mechanism is used in the general sense of a kinematic chain that consists of one or more elements, where the position of each point of the kinematic chain can be derived from the position of any other point of the chain. The term "manipulating element" in the present context means an element which in the kinematic chain precedes the actuator output element. For example, a shift fork represents a manipulating element, while a sliding sleeve represents an actuator output element. The actuator output mechanism typically includes the sliding sleeve of a shift clutch, a shift fork, a shift finger, and a transfer mechanism to establish a motion- and force-transmitting connection of the shift finger with the first and second drive mechanisms for the selection and engagement of the transmission ratios. The transfer mechanism works with a certain transfer ratio that may be defined, e.g., by levers and/or a worm-gear stage.

In further developed version of the invention, the adaptation of the synchronization threshold position includes the additional steps of:

mathematical processing of the detected synchronization threshold position by means of an arithmetic unit associated with the control device, and using the detected and mathematically processed threshold position directly, or determining a new synchronization threshold position based on the detected and mathematically processed threshold position and the old synchronization threshold position.

In another particularly preferred embodiment of the inventive motor vehicle in which the respective engaged end positions of the gear stages are stored in a memory that is associated with the control device and are adapted during operation of the vehicle, the synchronization threshold positions are determined at least during certain times on the basis of the adapted end positions of the gear stages.

It is advantageous in practice if the synchronization threshold position is determined on the basis of the adapted end positions of the gear stages at least once after a predetermined time period has elapsed or a predetermined number of independent adaptation processes have been performed. In a preferred embodiment of the invention, the predetermined time period is in the range between 40 and 200 hours, in particular between 80 and 120 hours, or the predetermined number of independent adaptation processes is between 15 and 80, in particular between 40 and 60.

The invention also offers a solution to meet a further aspect of the foregoing objective in a motor vehicle with an engine, a torque-transmitting device with a first actuating device, a transmission with an input shaft and an output shaft and a second actuating device, wherein the transmission has a plurality of gear pairs for the ratio steps of the transmission. Each gear pair has a fixed gear that is permanently connected to a shaft, and a free gear that is selectively connectable to a shaft. The vehicle further has a control device that controls the actuation of the first and second actuating devices. In a first operating mode of the control device, the control device initiates the actuation automatically on the bases of a plurality of input quantities. In a second operating mode, the actuation is initiated through an input given by the driver of the vehicle. In at least one of the ratio steps, the aforementioned selective connection of a free gear to its supporting shaft is performed by means of an actuator output element such as a sliding sleeve with a synchronizing device. During the engagement process of the free gear, the actuator output element with the application of a synchronizing force establishes an at least approximate match between the rpm-rates of the elements to be coupled. To meet the aforementioned further aspect of the objective of this invention, the magnitude of the synchronizing force can be varied dependent on whether the driver operates the vehicle in a more or less sport-oriented style, further dependent on the vehicle load, the transmission oil temperature, the position of the gas pedal or other engine-load control lever, the current demand for engine torque, the target rpm-rate, the rpm-difference at the synchronization device, the friction behavior of the synchronization device, the levels of drag torque produced by the transmission, and/or the condition of the synchronization device. Thus, the synchronization force is adaptable to a plurality of varying parameters that can change with the elapsed operating time and/or from one gear shift to the next, so that as a result, the synchronization process can always run in an optimized manner.

The following particularly preferred embodiment of the invention applies again to a motor vehicle with an engine, a torque-transmitting device with a first actuating device, a transmission with an input shaft and an output shaft and a second actuating device, wherein the transmission has a plurality of gear pairs for the ratio steps of the transmission. Each gear pair has a fixed gear that is permanently connected to a shaft, and a free gear that is selectively connectable to a shaft. The vehicle further has a control device that controls the actuation of the first and second actuating devices. In a first operating mode of the control device, the control device initiates the actuation automatically on the bases of a plurality of input quantities. In a second operating mode, the actuation is initiated through an input given by the driver of the vehicle. In at least one of the ratio steps, the aforementioned selective connection of a free gear to its supporting shaft is performed by means of an actuator output element such as a sliding sleeve with a synchronizing device. During the engagement process of the free gear, the actuator output element with the application of a synchronizing force establishes an at least approximate match between the rpm-rates of the elements to be coupled. The move into complete engagement is released only after the synchronization has been completed and the rpm-rates have been at least approximately equalized. According to the particularly preferred embodiment, the move of the actuator output element towards the synchronization threshold as well as the synchronization process itself are performed by controlling the force that drives the movement. This has particular advantages because upon reaching the synchronization threshold, a specific amount of force needs to be applied, which is accomplished advantageously by means of a force-oriented control process. This avoids the drawbacks associated with a transition between two different kinds of control, e.g., from controlling the speed of the movement to controlling the force.

For the control of the force on the actuator output element, it is advantageous to estimate the reactive force that opposes the move. In practice, the estimate of the reactive force can be based on the speed of the actuator output mechanism, taking into account the kinetic energy of the actuator output mechanism and, if applicable, its spring constant. This includes on the one hand the kinetic energy of the sliding sleeve and on the other hand also the kinetic energy of the moving parts of the transfer mechanism and the drive mechanism.

When considering the spring properties of the actuator output mechanism in particular in the presence of reactive forces that are larger than the response threshold of the spring stiffness, it is very advantageous to use the spring characteristic directly or indirectly as a reference for the estimate. The actuator output mechanism often includes a combined spring/damper element that allows a controlled setting of the spring stiffness. It is advantageous to use the characteristic curve of this spring/damper element. In some cases the stiffness of the mechanism itself may enter into the estimate as an additional factor.

In a particularly preferred development of the foregoing concept, the estimate of the reactive force is made on the basis of the energy-conservation principle as it relates to the amount of work performed by the drive source of the actuator output mechanism.

As a solution for another aspect of the inventive problem, a method is proposed for moving an actuator output element of a transmission-actuating mechanism into the position for synchronization as fast as possible without an oscillatory overshoot. It is particularly preferred to control the movement of the actuator output element through a force that is based on the mathematical equation for a damped oscillation, wherein the damping constant is selected so that the movement into the synchronized position can be performed independently of the starting velocity of the actuator output element, and wherein the synchronization force depends on the damping constant.

To address a further facet of the inventive problem, the invention proposes a control concept under which a targeted amount of force for the engagement of the sliding sleeve is generated on the basis of the speed of engagement and on the elasticity of the mechanism. The elasticity is used in a manner that is purposely designed to convert the kinetic energy of the moving actuator into potential energy (i.e., elastic deformation energy) at the moment when the actuator runs against the synchronization threshold.

Another particularly preferred embodiment of the invention again involves a transmission that includes synchronization devices between sliding sleeves and free gears. During a gear engagement, the synchronization device blocks a complete, form-locking engagement of the gear clutch at the synchronization threshold until the rpm-rates are at least approximately matched. As the further movement of the sliding sleeve is blocked at the synchronization threshold, the kinetic energy of the moving parts is converted into potential energy that is stored in the elastically deformable parts of the mechanism. According to the inventive concept, the reactive force generated by the elastic components as a result of the stored energy is at least approximately equal to the targeted amount of force.

In the present context, terms such as "targeted engagement force" or "synchronization force" refer to the force exerted on an actuator element such as a shift finger for the actuation of the sliding sleeve.

In a preferred embodiment of the invention, the speed of moving the shift clutch towards the synchronization threshold is selected dependent on the elastic force/displacement characteristic of the mechanism so that at the point where the further move into engagement has been blocked, the reactive force due to the energy stored in the elastic elements is approximately equal to the targeted engagement force. At this point, substantially all of the kinetic energy has been converted and stored as deformation energy in the elastic elements. As the speed of the movement has reached a minimum, the elastic energy is at a maximum at this point of the synchronization process. According to this embodiment of the invention, the exact magnitude of the target force for the synchronization threshold is advantageously set by appropriately controlling the speed of the movement towards the synchronization threshold.

In another useful embodiment of the invention, an elastic characteristic is selected dependent on the speed of the movement towards the synchronization threshold, so that at the point where the further move into engagement has been blocked, the reactive force due to the energy stored in the elastic elements is approximately equal to the targeted engagement force. According to this embodiment of the invention, the magnitude of the target force for the synchronization threshold is set by appropriately selecting an appropriate elastic characteristic.

In a preferred embodiment, the point where elastic deformation begins to take place is significantly below the level of the forces that occur in the synchronization process. Thus, the build-up of the force at the synchronization threshold in each synchronized gear-engagement process takes advantage of the elastic force/displacement characteristic of the actuating mechanism.

Dependent on the targeted force at the synchronization threshold, the preferred point for the elastic deformation to begin is at a synchronization force between 50 and 450 N, or between 200 and 600 N, or between 400 and 1000 N. In a particularly preferred embodiment, the threshold force where the elastic behavior begins to manifest itself is in a range between 150 and 350 N.

The invention further proposes a method of operating a motor vehicle transmission that has a plurality of gear pairs for the ratio steps of the transmission. Each gear pair has a fixed gear that is permanently connected to a shaft, and a free gear that meshes with the fixed gear and is selectively connectable to another shaft. The transmission has sliding sleeves for coupling each of the free gears to the shaft on which it is supported. There are means for driving the movement of the sliding sleeve into and out of engagement, a mechanism that connects the driving means to the sliding sleeve, and synchronization devices acting between sliding sleeve and free gear. During the engagement process of the free gear, an engagement force acting on the synchronization device generates a synchronization torque, and the further movement beyond the engagement threshold is blocked until at least an approximate match of the rpm-rates has been attained. The transmission further has a degree of elasticity in the connecting mechanism between the driving means and the sliding sleeve. The mechanism is appropriately designed so that kinetic energy can be converted into potential energy (i.e., elastic deformation energy) and vice versa. The transmission further has a controlling device for the control of the aforementioned driving means. According to the inventive method, the process of shifting into a transmission ratio encompasses the steps of a) moving the sliding sleeve in a speed-controlled mode in the direction of engagement, b) detecting the magnitude of the opposing force generated by the blockage of the movement at the synchronization threshold, and c) changing to a force-controlled mode of actuation, wherein the blockage of the engagement movement at the synchronization threshold absorbs kinetic energy and causes it to be stored as elastic energy that is used as a significant contribution in generating the targeted amount of synchronization force.

The method of the foregoing description is preferably applied to operating a transmission according to any of the embodiments described and claimed herein.

The invention will be discussed in further detail based on examples that are illustrated in drawings, wherein

BRIEF DESCRIPTION OF THE DRAWING FIGURES

Figure 2A:
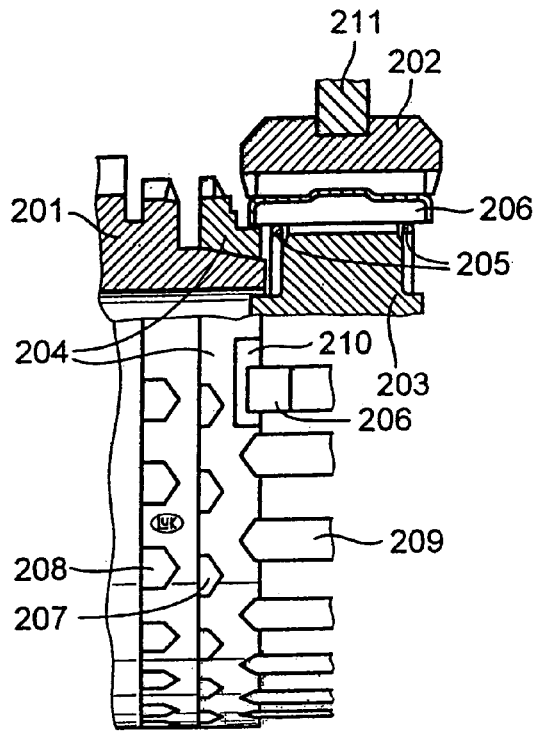
Figure 2B:
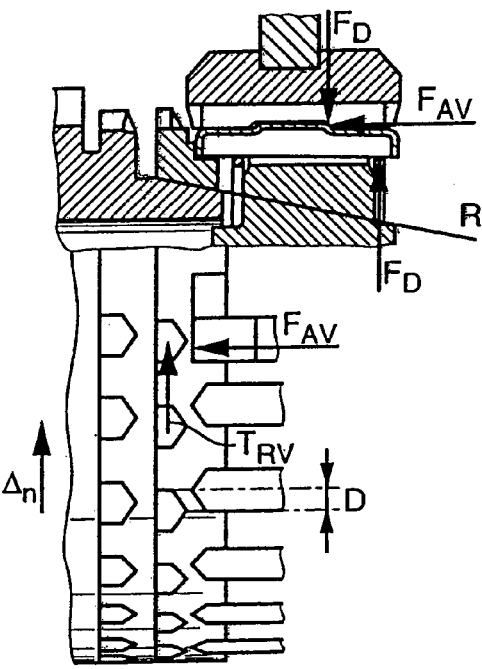
Figure 2C:
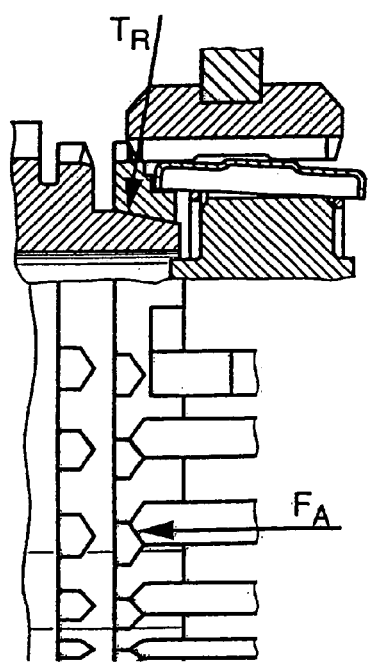
Figure 3B:
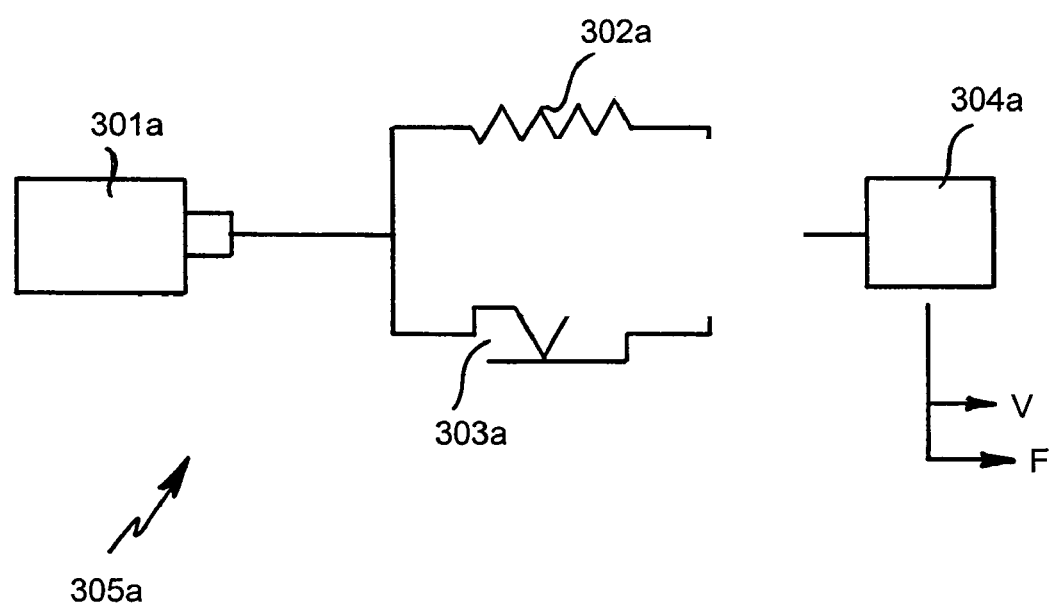
Figure 4A:
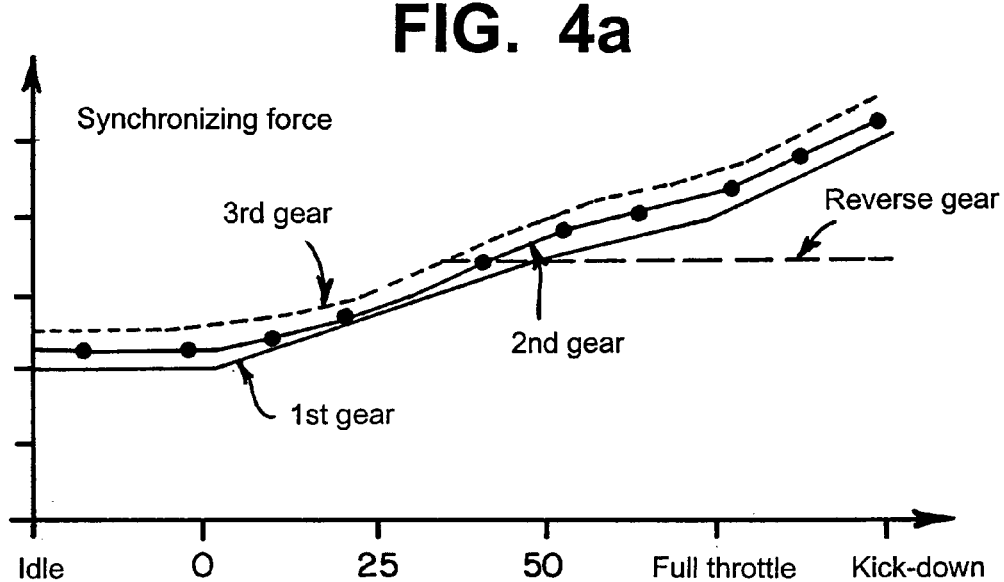
Figure 4B:
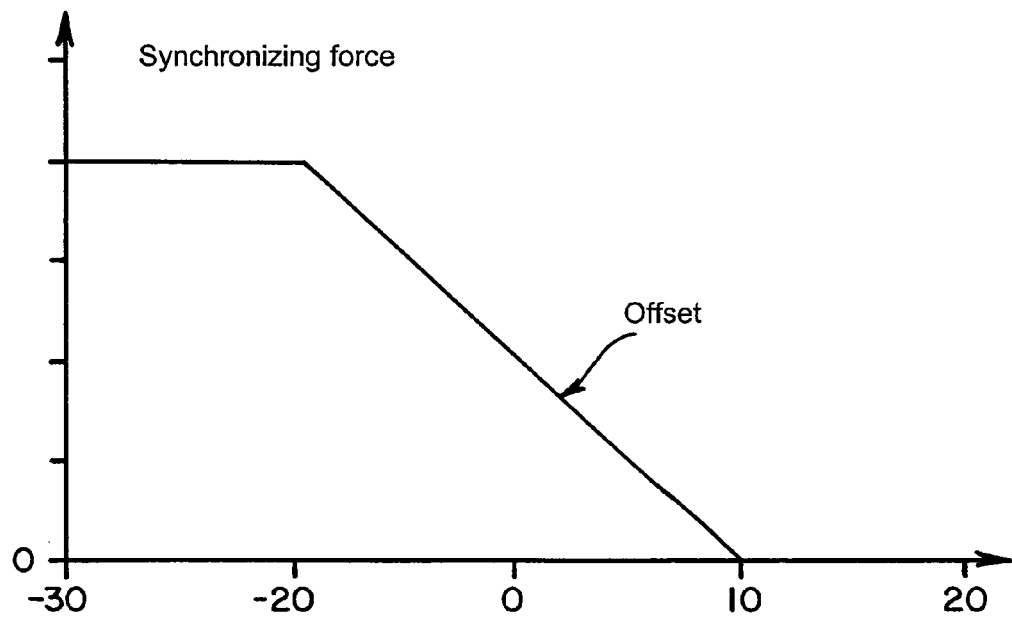
Figure 4C:
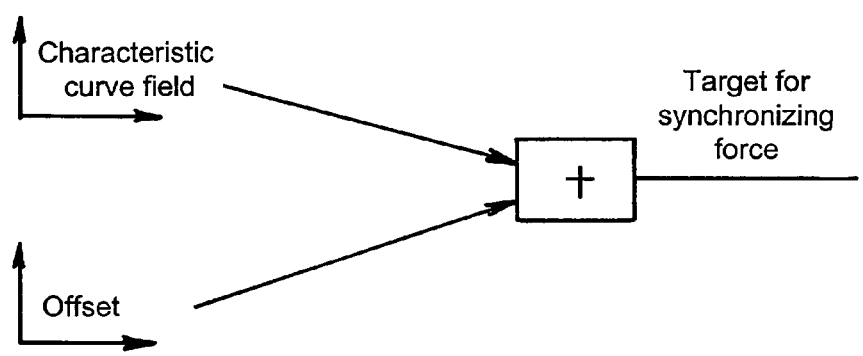
Figure 4D:
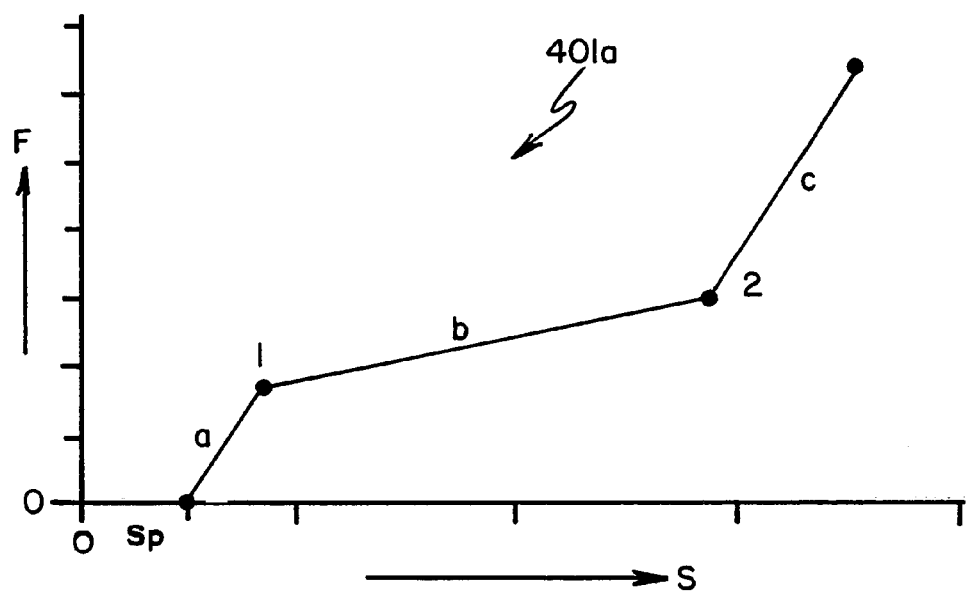
Figure 5A:
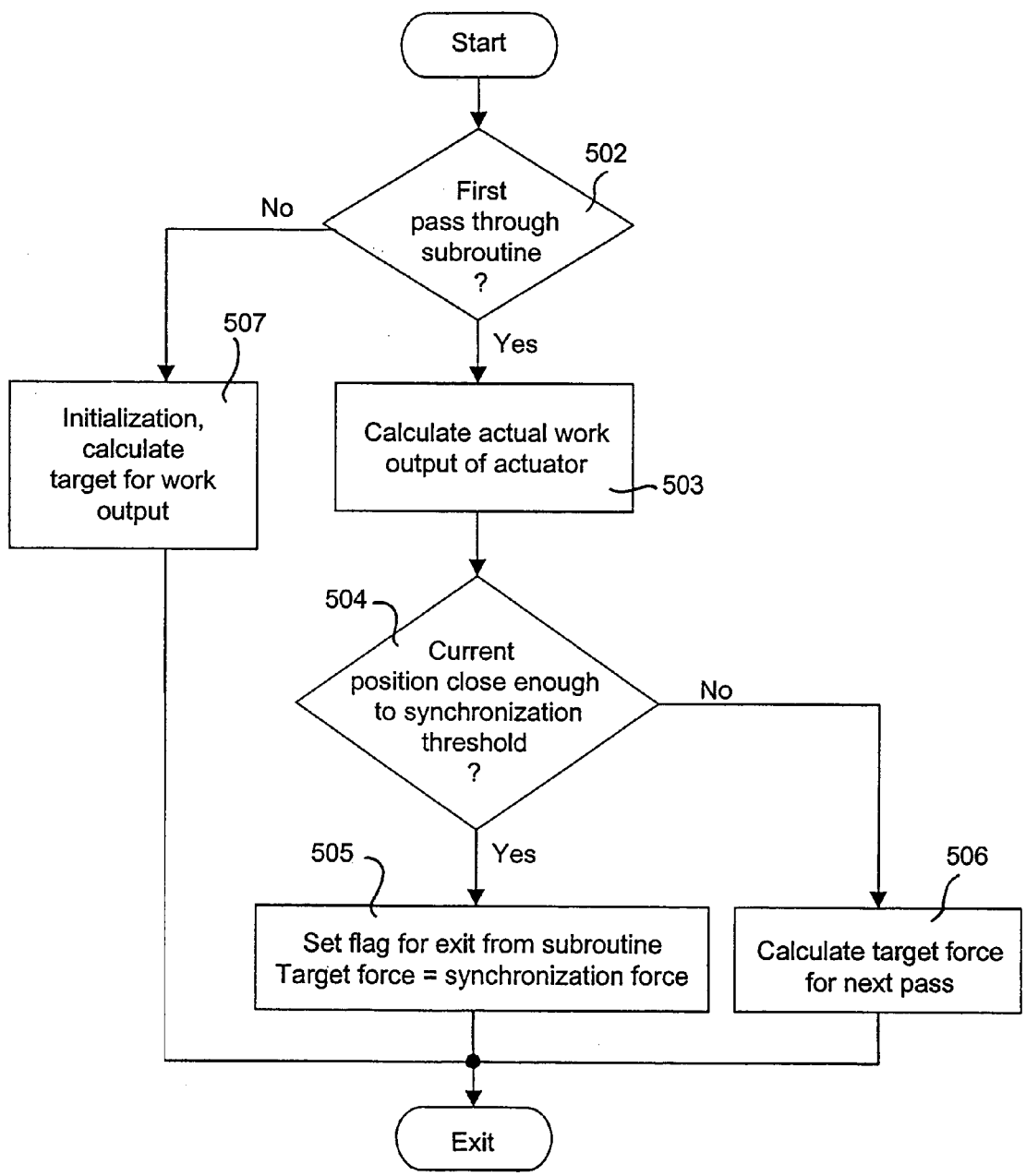
Figure 5B:
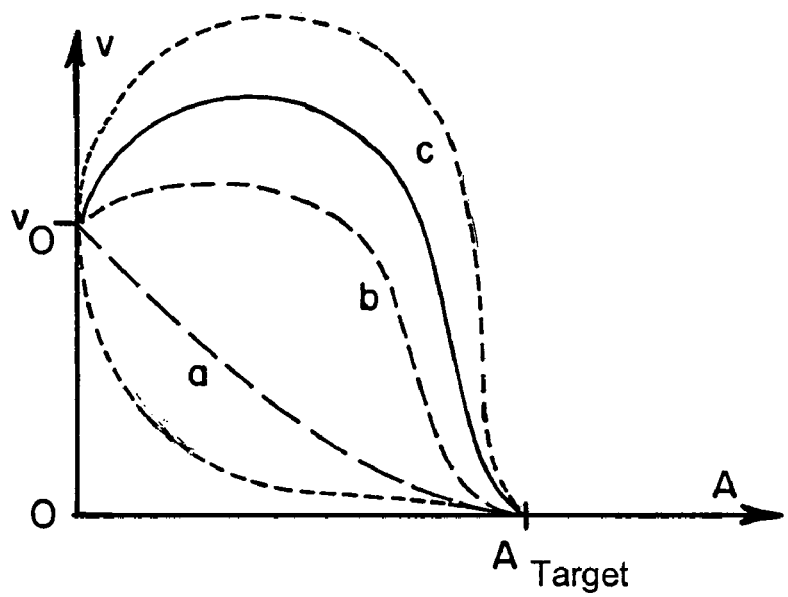
Figure 5C:
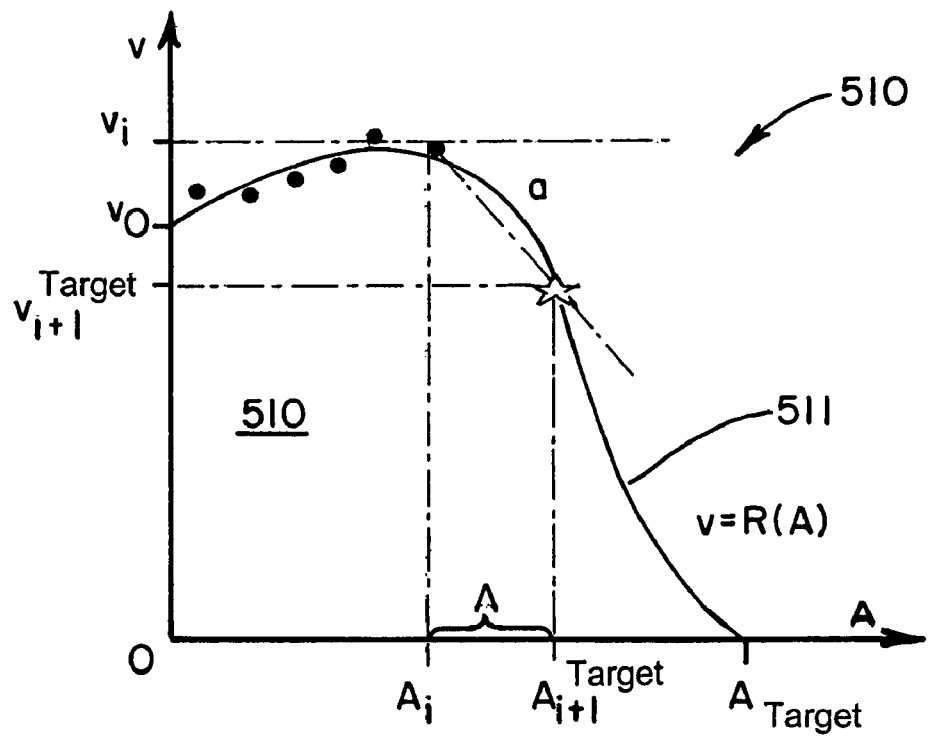
Figure 6:
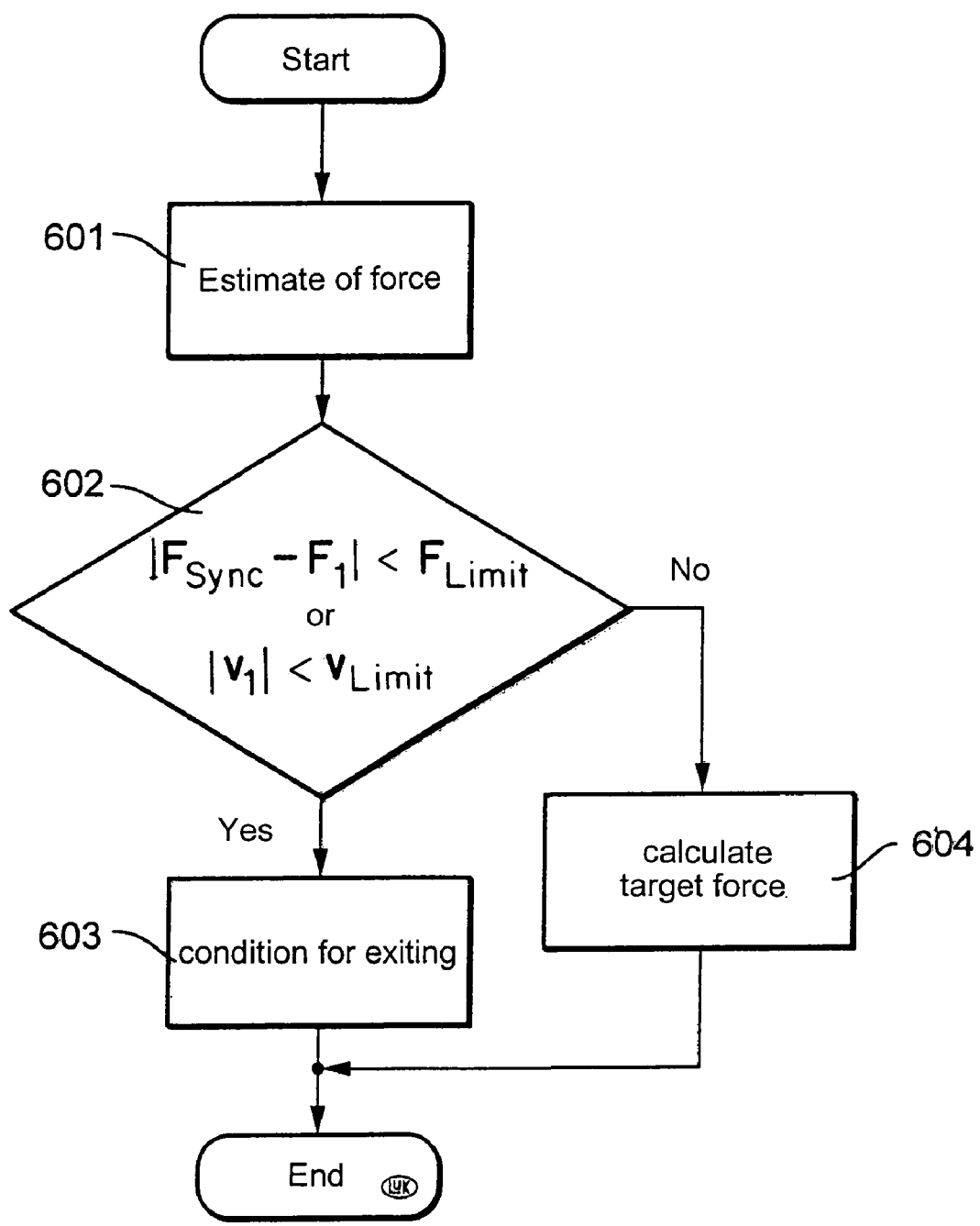

FIG. 1 schematically represents an example of a vehicle with a torque-transfer device and a transmission, both of which can be actuated in an automated mode, FIGS. 2A–2C illustrate cross-sectional views of a shift clutch, FIGS. 2D–2F represent schematic views of a shift clutch, FIG. 3A illustrates in a schematic flowchart format the criteria for initiating an adaptation of the synchronization threshold, FIG. 3B schematically represents an example of a drive source and a sliding sleeve with a connecting mechanism, FIG. 4a illustrates in a graph the dependency of the synchronization force, e.g. on the position of the gas pedal or other engine control element, FIG. 4b illustrates in graph format an offset of the synchronization force which in the illustrated example is dependent on the transmission temperature, FIG. 4c illustrates in an example how a targeted synchronization force is obtained by adding an offset to the synchronization force determined from a characteristic data field;

FIG. 4d represents an example of a force/displacement characteristic of the elasticity that is present in the connecting mechanism, FIG. 5a represents a flowchart for the control of the drive source that actuates the sliding sleeve, FIG. 5b illustrates several possibilities to reach the target position of the sliding sleeve depending on the targeted amount of work performed by the drive source, illustrated in a velocity vs. work graph, FIG. 5c illustrates an advantageous way of approaching the target position, illustrated in a velocity vs. work graph, and FIG. 6 represents a flowchart for the control of the drive source that actuates the sliding sleeve.

DETAILED DESCRIPTION OF PREFERRED EMBODIMENTS

FIG. 1 schematically illustrates an example of a vehicle 1 with a torque-transmitting device 4 and a transmission 6. The torque-transmitting device 4 is arranged in the torque flow path between the engine 2 and the transmission 6; it is useful to arrange a divided flywheel mass between the engine 2 and the torque-transmitting device 4. The mass components of the flywheel mass can rotate relative to each other against the resistance of an interposed spring damper device, a measure that improves in particular the oscillatory properties of the drive train. The present invention is preferably combined with a damper device that absorbs, compensates or attenuates rotary shocks and/or oscillations as described in particular in the published German patent applications DE OS 34 18 671, DE OS 34 11 092, DE OS 34 11 239, DE OS 36 30 398, DE OS 36 28 774, and DE OS 37 21 712, which have the same assignee as the present invention. The vehicle 1 is powered by an engine 2, represented in this case by a combustion engine such as an Otto-cycle engine or a diesel engine. Other embodiments use a hybrid drive, an electric motor, or a hydrogen-powered drive source. The torque-transmitting device 4 in the illustrated example is a friction clutch that serves to separate the engine 2 from the transmission 6, in particular when taking off from a standstill or to shift gears. By varying the degree of clutch engagement, a larger or smaller amount of torque is transmitted. The varying degree of engagement is obtained by moving a pressure plate and a counter pressure plate relative to each other in the axial direction, thereby varying the degree to which an interposed friction disc is taken along by the rotation. The torque-transmitting device 4, in this case a clutch, is preferably self-adjusting, which means that the wear of the friction linings is compensated in order to ensure that the amount of force required for disengagement remains at a constant, moderate level. Preferably, the invention is combined with a friction clutch, particularly of the kind described in the published German patent applications DE OS 42 39 291, DE OS 42 39 289, and DE OS 43 06 505, which have the same assignee as the present invention. The wheels 12 of the vehicle 1 are driven by means of a shaft 8 through a differential 10. The driven wheels 12 have rpm-sensors 60, 61 generating a signal representing the rate of rotation of the respective wheel. In some cases, there may be only one rpm-sensor 60 or 61. In addition or as an alternative, a sensor 52 is arranged at another appropriate location in the drive train, e.g., on the shaft 8 for the measurement of the transmission output rpm-rate. The transmission input rpm-rate can be measured by means of a further sensor, or it can also be determined from the engine rpm-rate, as is the case in the illustrated example. The result can be used, e.g., to determine the currently active transmission ratio. The friction clutch 4, which in this example is push-actuated but could also be pull-actuated in a different embodiment, is preferably operated by means of an actuating device 46 such as a clutch actuator. The transmission 6 is operated through an arrangement of two actuators 48 and 50, one of which actuates the selection while the other actuates the engagement of a desired transmission ratio. The clutch actuator 46 and/or the transmission actuators 48, 50 are electrical DC motors. In another embodiment, particularly if large actuating forces are required, it may also be very appropriate to use a hydraulic system for the actuation. The control of the clutch 4 and the transmission 6 is performed by a control device 44. It is practical to combine the control device 44 with the clutch actuator 46 in a modular unit, but it may also be advantageous in another embodiment if the control device 44 is arranged at a different location in the vehicle. The actuation of the clutch 4 and the transmission 6 can run in an automated operating mode under the control of the control device 44, or in a manual operating mode under the control of the driver by means of a transmission-ratio selecting device such as a shift lever, where the driver's selection is detected by means of a sensor 61. In the automated operating mode, the change from one transmission ratio to another is performed through appropriate command signals to the actuators 46, 48 and 50 in accordance with characteristic data arrays that are stored in a memory of the control device 44. There are a plurality of driving programs that the driver can choose from, each of which is defined by at least one characteristic curve or array, such as a sport-oriented driving program in which the engine 2 is operated in a manner that optimizes performance, an economy program in which the engine 2 is operated in a manner that optimizes fuel economy, or a winter program in which the vehicle is driven in a manner that optimizes safety. As a further feature of this embodiment, the characteristic curves can be adaptively adjusted, e.g., to the driver's operating style and/or other extraneous conditions such as pavement friction, exterior temperature, etc. A control device 18 controls the engine 2 by controlling the delivery rate and composition of the fuel mixture, as symbolically indicated by a throttle valve 22, whose aperture angle is detected by means of an angle sensor 20 and whose output signal is transmitted to the control device 18. In other embodiments of combustion engines equipped with an engine control, the control device 18 receives a signal from which the composition and/or the delivery rate of the fuel mixture can be determined. If the vehicle is equipped with a Lambda-Sond® sensor (oxygen sensor), it is appropriate to use its output signal, too. The control device 18 of the present embodiment further receives a signal from an engine-control lever (usually a gas pedal) 14 whose position is detected by means of a sensor 16, an engine rpm-signal generated by an rpm-sensor 28 arranged at the engine output shaft, a signal of a vacuum sensor 26, as well as a signal of an engine-coolant temperature sensor 24. The control devices 18 and 44 can be configured as spatially and/or functionally separate units, in which case they are connected in an appropriate manner, e.g., by a CAN-bus 54 (Central Area Network bus) or other electrical data connection. However, it may also be advantageous to consolidate the control devices, in particular in view of the fact that the functions can not always be clearly assigned to one or the other and the devices have to cooperate with each other. In particular during certain phases of the transmission ratio change, the control device 44 may control the engine 2 in regard to the rpm-rate and/or the torque. The clutch actuator 46 as well as the transmission actuators 48 and 50 generate signals from which the control device 44 can at least derive an actuator position. The determination of a position occurs in this case within the actuator by means of an incremental position detector that measures the actuator position in relation to a reference point. However, in another embodiment it may also be advantageous to arrange the sensor outside of the actuator and/or to use an absolute position measurement, e.g. by means of a potentiometer. The determination of the actuator position in the clutch actuator is of high importance for the particular reason that it provides a correlation between the threshold where the clutch begins to transmit torque and a specific amount of displacement of the clutch actuator. It is advantageous if the threshold for torque transmission of the clutch 4 is determined at the time the vehicle is put into operation and again at repeated intervals during operation. In particular, this re-determination should be performed dependent on parameters such as clutch wear, clutch temperature, etc. The detection of the transmission actuator position, on the other hand, is important in that it indicates which of the transmission ratios is currently engaged. The control device 44 further receives signals from rpm-sensors 62, 63 of the non-driven wheels 65, 66. To determine the traveling speed of the vehicle, it may be practical to use the mean value of rpm-sensors 62 and 63, or 60 and 61, in order to eliminate the difference in rpm-rates that occurs when the vehicle travels along a curve. The rpm-signals can be used to determine the traveling speed of the vehicle, and in addition they can also serve for the detection of wheel slippage. The output connections of the control devices are shown in the drawing figure as solid lines, while the input connections are shown as broken lines. The connection of the sensors 61, 62 and 63 to the control device are indicated only partially in the drawing.

FIGS. 2A–2C schematically illustrate an example of a synchronized shift clutch of a transmission, which serves to connect the free gear 201 to the synchronizer body 203 that is rotationally constrained to the shaft. FIG. 2A shows the sliding sleeve 202 in the neutral position. FIG. 2B shows the preliminary synchronization, and FIG. 2C shows the main phase of the synchronization. The sliding sleeve 202 is actuated by way of a shift fork 211. The sliding sleeve, together with the synchronizer ring 204 that forms the synchronization device with the pressure pieces 206 and their associated pressure springs 205, is rotationally constrained but axially movable on the synchronizer body 203.

During the pre-synchronization phase illustrated in FIG. 2B, the sliding sleeve 202 is moved by the pre-synchronization force FAV in the direction towards the free gear 201. Due to the friction at the conical surface R between the synchronizer ring 204 and the free gear 201, a pre-synchronization torque TRV is built up, which causes the synchronizer ring 204 to move until the synchronizer keys 206 are stopped by the lateral borders of the key recesses 210 in the starting position for the blocking engagement. In this starting position, the axial movement of the sliding sleeve 202 causes the tooth slopes of the respective engagement profiles 209 and 208 of the sliding sleeve and the free gear to face each other in axial alignment in the area D. As the process continues, the pre-synchronization force FAV, due to a ramp-shaped configuration in the area where the synchronizer keys meet the sliding sleeve, causes the synchronizer keys 206 to tilt against the elastic force FD of the compression spring 205, thereby enabling a further axial displacement of the sliding sleeve 202. At this point, the main phase of the synchronization C begins, where the tooth slopes of the respective engagement profiles 209 and 208 of the sliding sleeve and the free gear come into contact with each other. In the present context, this position is referred to as the synchronizing position. During this phase, the axial synchronizing force FA is acting against the tooth slopes while the friction torque TR is generated at the conical friction surface between the synchronizer ring 204 and the synchronizer cone of the free gear 201, whereby the rpm-rate is synchronized between the free gear 201 and the sliding sleeve 202.

In another embodiment, the synchronization device can be connected to the free gear, and there are practical embodiments where other configurations of the synchronization device are used. In some cases, the synchronizing position may differ from the foregoing definition. However, the inventive concepts as set forth herein remain applicable with no change in regard to the underlying principle.

FIG. 2*a* represents a schematic view of an example of a shift clutch in a transmission, which serves to couple a free gear 205*a* to its supporting shaft 201*a*. A connecting element 202*a* is solidly connected to the shaft 201*a*, i.e., axially as well as rotationally constrained on the shaft 201*a*. A sliding sleeve 203*a* is axially slidable but rotationally fixed on the connecting element 202*a*. A synchronizer device 204*a* is connected to the free gear 205*a*.

In the initial position 200*a*, the mating parts 202*a* and 205*a* of the shift clutch are still separated from each other. The sliding sleeve 203*a* is in a completely disengaged position A'. As the sliding sleeve 203*a* is moved in the direction of the arrow, a position 210*a* is reached in which a conical friction surface of the synchronizing device 204*a* makes contact with a corresponding surface of the sliding sleeve 203*a*. Due to the friction and the engagement force acting in the direction of the arrow, the free gear 205*a* is increasingly taken along by the rotation of the sliding sleeve. The interactive drag torque that occurs in this phase between the free gear and the sliding sleeve can activate a blocking device which may be arranged, e.g., on the sliding sleeve 203*a* to prevent the sliding sleeve 203*a* from moving further towards engagement. This position is referred to as the synchronizing position or synchronization threshold. At the point where the free gear 205*a* has attained at least approximately the rpm-rate of the sliding sleeve 203*a*, i.e., when the interactive torque is has fallen approximately to zero, the blocking device is released, so that the sliding sleeve 203a is allowed to move from the position B' to the position C'. In the completely engaged position 220a, a form-locking engagement has been established between the sliding sleeve 203a and the free gear 205a, so that the free gear 205a is coupled to the shaft 201 by way of the sliding sleeve 203a and the element 202a.

The flowchart of figure 3A schematically illustrates the criteria that have to be satisfied for initiating an adaptation of the synchronization threshold. Step 301 is a yes/no test as to whether the vehicle is standing still. In practice, the criterion may require that the vehicle has been standing still for a given time interval t, for example to ensure that fast rotating shafts have been slowed down. If the criterion 301 is not satisfied, no adaptation of the synchronization threshold is performed, as indicated in step 307. In the affirmative case of step 301, the next-following criterion 302 tests whether a vehicle brake is applied in order to ensure that the vehicle cannot be put in motion by the small amount of torque required for the adaptation, which is transmitted to the wheels. If no brake is applied, the flow chart continues at step 307, i.e., no adaptation of the synchronization threshold takes place. In the affirmative case of step 302, the next-following criterion 303 tests whether the engine is running at idling speed in order to avoid an excessive rpm-difference at the synchronizing device. If the engine is not found to be at idling speed, no adaptation of the synchronization threshold is performed. In the affirmative case of step 303, the next-following criterion 304 tests whether a gear stage is engaged in the transmission. In the negative case of step 304, no adaptation of the synchronization threshold takes place. In the affirmative case of step 304, the next following criterion 305 tests whether an adaptation is required. In the negative case of step 305, the routine passes on to step 307, i.e., no adaptation takes place. In the affirmative case of step 305, the next and last criterion 306 tests whether another adaptation with a higher priority ranking is present. If this is the case, the routine proceeds to step 307, i.e., no adaptation is performed. If no adaptation with a higher priority ranking is present, the routine proceeds to step 308, i.e., the process of adapting the synchronization threshold is now carried out. If another adaptation with a higher priority ranking or a different function which would interfere with the adaptation of the synchronization threshold needs to be performed, the adaptation of the synchronization threshold is postponed until the higher ranking adaptation or other function has been completed, and the adaptation of the synchronization threshold is performed subsequently.

The foregoing chain of criteria for initiating an adaptation of the synchronization threshold is meant as an example. In another embodiment, the criteria could be arranged in a different sequence. It may in particular be appropriate to start with the tests on whether an adaptation is required and whether another adaptation of higher priority or another function is in process. It may also be practical to proceed against the negative outcome of one or more criteria, i.e., to continue in the direction towards step 308 where the adaptation will be carried out, even though the criterion leads to the branch towards step 307. This possibility is indicated by the broken lines in the flowchart. It may further be advantageous in other embodiments, if the adaptation of the synchronization thresholds is made dependent on different or additional criteria.

In a preferred embodiment, the start-up clutch 4 of the vehicle is engaged in preparation for an adaptation of the synchronization threshold. In practice, it is sufficient to move the clutch far enough into engagement to transmit a clutch torque which is large enough that the blocking device connected to the sliding sleeve will become activated. As a next step, the shifting mechanism of the transmission is moved in the selector path to the position of the gear stage whose synchronization threshold is to be adapted. For example, the gear-selection actuator 48 is moved in such a way that a shift finger becomes coupled to the shift fork that belongs to the targeted ratio, or that the shift finger ends up at least close to the targeted shift fork. The foregoing selector movement is preferably directed to the center position of the engagement track associated with the targeted gear ratio as a starting position for the adaptation, because all positions are conveniently reachable from there. However, in modified embodiments, it may also be advantageous to move to another position, e.g., to a point immediately before the engagement track of the gear ratio whose synchronization threshold is to be adapted. From the starting position, which is preferably located in the neutral track of the shift pattern but in any event needs to be a position from which the synchronization threshold will with certainty be traversed, the sliding sleeve is moved in the direction towards the engaged end position of the targeted gear ratio. This movement of the sliding sleeve is performed at a very slow speed in comparison to a normal gear-shifting process. The movement in the direction towards the end position is preferably performed at a defined speed under rpm-control, or with a defined acceleration under control of the rotary acceleration rate, or with a defined force under torque control, or by controlling the angular position of the drive source, or with a defined displacement either through an iterative control or with a stochastic target displacement, by controlling either the voltage or the current of the drive source. It can also be advantageous to use a combination of the aforementioned types of control.

Thus, with the engine 2 running—preferably at idling speed—and the clutch 4 in an engaged condition, there will be an rpm-difference between the transmission input shaft and the transmission output shaft. As shown in FIG. 2 and described in the context, the interactive drag torque in the synchronization device has the effect of opposing the further move towards engagement. The position of the sliding sleeve in this particular state can be taken as a preliminary value for the synchronizing position. The position of the slide clutch determined in this manner can be used as a raw data value, or it can be further processed by applying corrective data. As an advantageous practice, the value to be used after the adaptation is calculated from the newly determined value and the old value.

An appropriate way of detecting the state when the further movement of the sliding sleeve 203 is blocked is to observe the displacement, speed, and acceleration of the sliding sleeve. This information is advantageously acquired by sensors in the area of the actuator output mechanism or a mechanism that drives the actuator output mechanism. A preferred solution is to use a transducer that is integrated in the drive mechanism, such as an incremental displacement sensor. According to another embodiment, the blocking of the movement is detected in an area close to the sliding sleeve—particularly ahead of an elastic member which may be part of the shift mechanism, so that the detection signal will not be falsified by elastic deformation and/or loose play in the mechanism. In another embodiment, the blockage of the sliding sleeve 203 is detected through a force measurement in the area of the kinetic chain between the sliding sleeve and the drive mechanism. In yet another advantageous embodiment, the blockage of the sliding sleeve 203 is detected by way of the power consumed by the drive source.

In the preferred embodiment, the synchronizing position is determined from the angular position, the rpm-rate, or the angular acceleration of the drive motor. As a preferred solution, an angular position sensor is used which is integrated in the drive mechanism. In another preferred embodiment, the position is determined through the voltage or current of the drive motor. In other advantageous embodiments, the position is determined by means of the angular velocity and/or the torque transmitted through one or more shafts of the transmission. In another practical application of the inventive concept, the blockage of the sliding sleeve is determined by a combination of the foregoing measures.

For the arithmetic processing of the detected synchronizing position by means of an arithmetic unit, the preferred embodiment makes use of an algorithm that applies a multiplicative or additive correction to the detected synchronizing position. In another embodiment, the correction algorithm is based on another mathematical relationship such as an exponential or logarithmic function, a differentiation, or an integration. It may also be advantageous to use one of these alternative algorithms in combination with the correction as used in the preferred embodiment described above. The algorithm that ends up as the preferred solution is developed on the basis of empirical values, experiments, calculations based on models of the kinematic transmission chain, simulations, measurements and/or analyses of the design drawings.

If in the preferred embodiment, the new synchronization threshold is determined from the newly determined threshold position and the old threshold position, the new synchronization threshold may conform for example to the following equation:

$$S_{new}=(x \cdot S_{old}+y \cdot S_{new})/100,$$

wherein the factor x is preferably large in comparison to y, with x being for example between 80 and 100, and y being between 0 and 20.

In the preferred embodiment, an adaptation of the synchronization thresholds is performed if the criteria described above are met. However, if the driver depresses the gas pedal, for example if the adaptation is taking place during a stop at a traffic light, the vehicle should change into an accelerating mode as quickly as possible. The desired gear ratio needs to be engaged immediately in this case, as soon as the transmission is shifted out of neutral and/or the vehicle brake is no longer applied. Particularly preferred is an embodiment where the desired gear ratio is engaged under these circumstances within 600 milliseconds, and with special preference between 300 and 400 milliseconds.

The examples described above are also applicable as an initializing routine for a first-time determination of the synchronizing positions of the gear ratios when a prototype or serial production vehicle is put into operation.

Due to the above-described way in which the synchronizing device operates, the synchronization torque is dependent on the friction coefficient $\mu$ of the synchronization device, the synchronization force $F_{sync}$ acting in the direction of engagement, and the radius $R_{Friction}$ of a ring-shaped synchronizing device on which the friction is acting tangentially. The synchronization torque conforms approximately to the equation:

$$M_{sync}=\mu \cdot R_{Friction}.$$

The magnitude of the synchronization torque has a direct effect on the comfort level of the shift process, because a large synchronization torque can cause undesirable noise and vibrations in the power train. The synchronization torque can be controlled through the synchronization force $F_{sync}$.

According to a preferred embodiment of the invention, the synchronization force $F_{sync}$ can be varied in order to avoid noise or vibrations in the power train as much as possible, so that the shift process is made more comfortable. The synchronization force $F_{sync}$ can be controlled dependent on one or more parameters, as described below. In the example of FIG. 4a, the synchronization force is dependent on the gas pedal position. FIG. 4b shows a synchronization force with an offset amount that is dependent on the transmission temperature. FIG. 4c shows how a control target for the synchronization force is obtained by adding an offset force to a synchronization force value that is based on a characteristic field or array.

In the case where the synchronization force depends on the gas pedal position as shown in FIG. 4a, the synchronization $F_{sync}$ force is increased with larger amounts of gas pedal depression. The increase in each gear ratio follows a specific characteristic curve. From a level of force that is used at the null-position of the gas pedal, the synchronization force $F_{sync}$ in a preferred embodiment is raised to about twice the amount at full throttle. If a gear shift is performed in kick-down mode, the synchronization force $F_{sync}$ is increased even further. For a small vehicle with an engine displacement of 1.0 to 1.8 liter, it is for example advantageous to increase the synchronization force from a low level of 120–310 N, in particular 190–250 N, to a high level of 420–650 N, in particular 490–560 N. In larger vehicles, the high and low levels of the synchronization force will have correspondingly larger values. No variation of the synchronization force is used for the reverse gear in the illustrated embodiment. The exact profile of the characteristic curves depends on the specific magnitude of the synchronization force $F_{sync}$ that works best at a given position of the gas pedal. This can be determined, e.g., mathematically or through experiments. As a result, the shift process is optimized with regard to the synchronization force $F_{sync}$ for each gear ratio dependent on the gas pedal position. It is advantageous if the characteristic curves follow a substantially linear relationship, although it may be practical in a different embodiment to use characteristic curves or curve segments with a substantially non-linear character, such as sine-, tangent-, exponential, logarithmic, or parabolic functions or similar curve patterns. In order to simplify the control, it can also be advantageous in a further embodiment to use a single characteristic curve for all transmission ratios, or at least to use the same characteristic curve more than once.

FIG. 4b illustrates an offset force that is dependent on the transmission oil temperature, as an example of a parameter-dependent offset. The offset force in the graph has a constant value at transmission oil temperatures below −20° C. and decreases linearly to zero over the temperature range from −20° C. to 10° C., so that no offset force is prescribed for the temperature range above 10° C. Of course, the offset as a function of the transmission oil temperature depends on the viscosity of the transmission oil as a function of temperature. The illustrated example is based on the assumption that one of the conventional multigrade oils is used. The offset serves to adjust the synchronization force to the viscosity of the transmission oil. An increasing loss of force due to the lower viscosity at higher temperatures is compensated. As a practical measure, it is advantageous when changing to a different transmission oil, to use an appropriate profile for the offset of the synchronization force. In the preferred embodiment, the relationship between offset force and temperature is linear, but in a different embodiment it may be appropriate if the functional relationship at least over parts of the range is equal or similar to a sine-, tangent-, logarithmic, exponential or parabolic function.

As shown in FIG. 4c, the target amount of the synchronization force in the preferred embodiment is composed of a synchronization force that is based on a characteristic curve field such as the curves shown in FIG. 4a and an offset that conforms to an offset function such as the relationship illustrated in FIG. 4b. In other advantageous embodiments of the invention there are practical advantages in varying the target value for the synchronization force as a function of different and/or additional parameters, and/or to set a different or additional offset value based on different parameters.

In an advantageous embodiment of the invention, the synchronization force $F_{sync}$ is varied as a function of a driver-related characteristic. This characteristic can for example be indicative of a type of driver, where on a scale from 1 to 100, a value of 1 characterizes a driver who is economy-oriented while a value of 100 indicates a very performance-focused driver. The type of driver can be detected, e.g., from observing the pattern of gas-pedal actuation or brake actuation and/or—in the case of a manual gear shift—from the frequency of gear changes. In the preferred embodiment, the synchronization force $F_{sync}$ increases with the value of the driver-type index as defined above. The dependency of the synchronization force on the driver-type index is preferably linear, at least in a first approximation. In another embodiment, a non-linear relationship is favored at least over parts of the range, equal or similar to a sine-, tangent-, logarithmic, exponential or parabolic function.

According to an advantageous further development of the inventive concept, the synchronization force $F_{sync}$ is varied on the basis of a mountain-driving index. The mountain-driving index may, e.g., indicate the slope gradient of the pavement on a relative scale of 1 to 100, where 1 indicates a level road or, in another embodiment, a very steep downward grade, and 100 indicates a very steep upward grade. The mountain-driving index can be determined, e.g., from observing the pattern of gas-pedal actuation or brake actuation and/or—in the case of a manual gear shift—from the frequency of gear changes, and/or based on one or more wheel rpm-rates. In the preferred embodiment, the synchronization force $F_{sync}$ increases with the value of the mountain-driving index as defined above. The dependency of the synchronization force on the mountain-driving index is preferably linear, at least in a first approximation. In another embodiment, a non-linear relationship is favored at least over parts of the range, equal or similar to a sine-, tangent-, logarithmic, exponential or parabolic function.

In other advantageous embodiments, the synchronization force $F_{sync}$ may be varied based on a demand for engine torque, so that a demand for a large torque causes the synchronization force to be increased. As another possibility, the synchronization force $F_{sync}$ may be varied based on a the targeted rpm-rate for the new gear in a gear change, so that a high target value for the rpm-rate causes the synchronization force to be increased. The synchronization force $F_{sync}$ may further be varied based on a the magnitude of the rpm-difference that has to be overcome in the synchronization, so that a high rpm-difference causes the synchronization force to be increased. As another possibility, the synchronization force $F_{sync}$ may be varied based on the friction properties of the synchronization device, so that a low coefficient of friction in the synchronization device causes the synchronization force to be increased. As yet another possible concept, the synchronization force $F_{sync}$ may be varied based on the moment of inertia of the targeted gear as it manifests itself at the synchronization device, so that a large effective moment of inertia causes the synchronization force to be increased.

It is further very advantageous to vary the synchronization force over the course of an individual synchronization process, particularly by lowering the synchronization force towards the end of the synchronization process. Among other benefits, this improves the comfort level of the gear-shifting process. The end of the synchronization process can be predicted, e.g., from the decline in the rpm-difference between the shafts that are to be synchronized, where the rpm-difference can be either directly measured or determined in the control device by means of a mathematical model.

A further concept of the invention relates to the manner in which the sliding sleeve is moved towards the synchronization threshold. According to the advantageous concept, the movement into the synchronizing position as well as the build-up of the synchronization force are performed by controlling the magnitude of the applied force. This allows a fast build-up of the synchronization force to be achieved regardless of possibly inaccurate synchronizing-position data stored in a memory of the control device 18, 44. This makes the entire control of the shift actuation more robust against uncertainty errors in the synchronizing position. The aim is to control the actuator drive mechanism so that the exact level of synchronization force $F_A$ is generated exactly at the point of the engagement movement when the sliding sleeve 202 comes to a stop at the synchronization threshold C. In a preferred embodiment, this control is performed on the basis of the work put out by the actuator drive mechanism, using a characteristic functional relationship between work and force. The synchronization force is determined by applying the principle of energy conservation to the mechanical work performed by the drive mechanism.

FIG. 3a schematically illustrates an example of a drive source 301a and a sliding sleeve 304a with a connecting mechanism 305a that includes an elastic element 302a and a damper 303a. The objective is to move the sliding sleeve 304a as rapidly as possible into the synchronizing position and after reaching that point, to set the desired synchronization force as rapidly and accurately as possible. The movement is driven by a motor through a transfer mechanism that includes the elastic component 302a and the damping component 303a. The elastic component is composed on the one hand of the design-related properties of the kinematic chain and on the other hand of an actual spring device that is intentionally incorporated in the design and contributes the main portion of the overall elasticity.

In a preferred embodiment, the spring device is composed of two elements that are rotatable relative to each other against the opposing force of compressive springs that are interposed between the two elements. The opposing spring force increases with the angle of rotation between the elements. It is advantageous if the rate of increase of the opposing spring force is non-uniform over the range of rotation. An example of the force/displacement characteristic is shown in FIG. 4d. The illustrated spring characteristic is obtained through a parallel or serial arrangement of a plurality of compressive springs with different spring characteristics. However, it may also be appropriate in a different embodiment to use an arrangement where the spring characteristic has a uniform rate of increase over the whole range of movement.

According to another concept of the invention, the elasticity is obtained by using an elastomeric material, in which the elastic properties are controlled by an appropriate selection or treatment of the raw material, for example through additives or through manufacturing or processing methods that influence the elastic properties. Analogous to the preceding embodiments, it is advantageous if the elastomeric material has an elastic characteristic with a rate of increase that varies over the operating range. Nevertheless, a different embodiment has a preferably uniform rate of increase over the entire range of its characteristic.

The elasticity of the preferred embodiment is characterized by a threshold force where the mechanism begins to behave elastically. This threshold is achieved by installing the elastic elements under a pre-tensioning (biasing) force, which lies in one of the ranges between 50 and 450 N, between 200 and 600 N, or between 400 and 1000 N. In a particularly preferred embodiment, the pre-tensioning force is in a range between 150 and 350 N.

According to a further preferred embodiment, the elasticity is distributed so that a plurality of individual elastic elements or components contribute to the desired overall effect. A further embodiment uses elements in which the load as well as the subsequently released force are acting in the axial direction. The elasticity in the present embodiment resides within the mechanism between the drive source and the sliding sleeve. In this context, the term "drive source" is used for the actual driving element, for example the rotor shaft of an electric motor. As a preferred arrangement, the elasticity is advantageously designed into components inside a housing that encloses the drive source and a gear stage that follows the drive source.

The element 303$a$ in figure 3$b$ represents the damper of the mechanism. The damping effect may occur as a result of friction that is designed into the mechanism, or it may be produced by an adjustable damping element. It is preferred in the illustrated embodiment, if the drive source 301$a$ for the sliding sleeve 304$a$ is controlled by the control device 18, 44 of FIG. 1 in such a manner that during a gear-engagement process, the clutch sleeve 304$a$ is moved in a velocity-controlled mode up to the synchronization threshold. At the point where an opposing force is detected because the continuing engagement is blocked by the mechanism described in the context of FIGS. 2A–2F, the process switches to a force-controlled mode. Because of the elastic energy stored in element 302$a$, the force at this point already approximates the targeted force level for the synchronizing position. The critical factor in this case lies in a precise match between the elastic element 302$a$ on the one hand and the speed of moving towards the synchronizing position on the other.

The movement into the synchronizing position is performed under velocity control. The velocity is regulated to a certain value that depends on the elasticity of the mechanism 305$a$ connecting the drive source 301$a$ and the sliding sleeve 304$a$ and on the desired target value for the synchronization force. In a preferred embodiment, the velocity of approaching the synchronization threshold is in the range between 25 and 200 mm/sec, corresponding to a target value of 250 to 1000 N for the synchronization force. Thus, with an elasticity as illustrated in the graph 401$a$ of FIG. 4$d$, if the target value for the synchronization force is increased by a factor of 3, the speed of moving to the synchronizing position has to be about 5 times faster.

During the velocity-controlled approach to the synchronizing position, there is already a force limitation imposed on the actuator. The limit is at first kept low in order to compensate for the friction in the mechanism. Above a certain velocity of the actuator movement, the limit is raised so that the rapidly increasing opposing force will not cause the drive mechanism to turn backwards. Preferably, the level of the force limitation is raised when the sliding sleeve has reached a velocity of 3 to 40 mm/sec, in particular when the velocity exceeds 5 to 25 mm/sec. To compensate the friction at lower velocities through the superimposed force limitation, it is practical to regulate the force independently of the factors that are causing the friction, such as the transmission oil temperature, so that the desired speed is always maintained. With a high level of friction, a strong compensation is applied, and as the friction decreases, the compensation is cut back commensurately.

The transition to a force-controlled mode occurs in the synchronizing position, where the further movement of the sliding sleeve is blocked and the kinetic energy of the movement is converted into elastic energy, so that an elastic force is built up that is at least close to the desired synchronization force. The friction is compensated by the continuing driving force of the actuating mechanism. If an electric motor is used in the actuator drive, the blockage of the movement is detected from the increase in the power consumption and/or the decrease of the rpm rate of the motor.

In the continuation of the process, the force is limited or set to the level of the desired synchronization force, which at this point requires only a relatively minor adjustment, because the force generated by the elasticity is at least approximately equal to the desired synchronization force which in the preferred embodiment is in the range between 100 and 1000 N. As a rule, the synchronization takes place in the range between 200 and 600 N. Synchronization forces up to about 1000 N are allowed only in cases where an especially fast synchronization is wanted.

At the transition to the force-controlled mode, if an electric actuator motor is used to drive the sliding sleeve 304$a$, the voltage and rpm-rate of the motor are used to determine the target value for the force. The actual friction force during the force-limitation phase is thereby exactly compensated. According to a further concept of the invention, a preferred mode or method offers the possibility of using a uniform elastic behavior for the different gear ratios of the transmission and/or for different transmissions and to build up the synchronization force through an appropriate velocity control of the movement to the synchronization threshold.

By purposely including the elasticity 302$a$ in the design of the overall process of synchronized gear engagement, the present embodiment benefits among other things from a significant time advantage. In regard to the shift elasticity 302$a$, the reader is referred to the German patent applications DE 197 34 023 A1 and DE 197 13 423 A1, which have the same assignee as the present invention and whose content is hereby expressly incorporated by reference in the present disclosure. Also within the scope of preferred ways of controlling the synchronized gear-engagement process, it is a particularly useful concept to store the position of the synchronization threshold as accurately as possible in a memory of the control device 18, 44 and to update the stored value at regular intervals.

The diagram 401$a$ in FIG. 4$d$ shows as an example a characteristic curve, i.e., a force/displacement diagram, of the shift elasticity residing in the mechanism 305$a$. After the mechanism has moved through an initial displacement Sp representing the loose play in the system, a relationship of the force as a function of displacement sets in as represented by the line segment a that ends at point 1, then continues in a line segment b at a markedly smaller rate of increase up to point 2, and then changes again to a markedly steeper rate of increase in the segment c that leads to the end of the displacement range. The point at which the elastic behavior begins to manifest itself, i.e., the force at which a noticeable amount of deformation begins to take place, is below the level of the forces that occur in a synchronized gear engagement process, i.e., in the upper portion of the segment a of the characteristic curve. An amount of shift elasticity is preferred in the present embodiment, where a displacement of about 3.5 mm requires a force of about 1300 N.

FIG. 5a illustrates a control process according to the invention in a flowchart format. Under the illustrated routine, the amount of work performed by the actuator is calculated by the control device 18, 44 in continuous, quasi-continuous, or discrete program loops. In a first pass, i.e., if the routine is called up for the first time, the outcome of the yes/no test in step 502 is affirmative, and the process proceeds to step 507 where the target amount for the work output is calculated. In subsequent passes through the routine, the outcome of step 502 is negative, and the process therefore proceeds to step 503, where the actual work output of the actuator is calculated. The subsequent step 504 represents a yes/no test whether the current position of the sliding sleeve is close enough to the targeted position, i.e., close enough to the synchronization threshold. In the affirmative case, the routine proceeds to step 505, where the exit flag (target force=synchronization force) is set, allowing the process to leave the loop. In the negative case of step 504, the process proceeds to step 506, where the target force is calculated based on where the current position falls in relation to the graph in the velocity/work diagram 510 of FIG. 5c, taking the force/work characteristic into account, which is advantageously determined through experiments, and in another embodiment is advantageously calculated based on the elastic characteristic of the mechanism. Thus, with every pass through the calculation, the target force of the next step is calculated based on the current point in the velocity/work diagram 510 of FIG. 5c, so that the guiding curve 511 is followed as closely as possible.

FIG. 5b illustrates a velocity/work diagram with a variety of different paths for attaining the target position, i.e., the synchronization threshold, by applying the targeted force corresponding to the targeted amount of work $A_{target}$. The boundaries of the curve field are represented as dotted lines in FIG. 5b. The upper limit is set by the maximum current and maximum voltage of the drive motor. Very slow paths such as the path a are undesirable because the build-up of the synchronization force would take too long, a factor which determines the lower boundary of the curve field. The objective is to perform the gear engagement along a fast path as represented by the curve c. The shape of a favorable path is represented in the diagram 510 of FIG. 5c.

According to a further embodiment of the invention, the control for setting the desired synchronization force (target amount of synchronization force) works without the use of position data for the synchronization threshold. The synchronization process itself as well as the movement up to the synchronization threshold are performed with a controlled actuating force. In another embodiment, it may also be advantageous to perform the movement up to the synchronization threshold at a controlled speed. To control the actuating force in this embodiment, the force that opposes the driving force is estimated continuously, quasi-continuously, or in another embodiment also at discrete intervals. The underlying concept is for the control device to perform a calculation that takes the stiffness of the kinematic chain between the drive source and the sliding sleeve as well as the kinetic energy of the actuating mechanism into account, whereby the synchronization force can be set very rapidly and precisely without overshooting the targeted amount. This procedure avoids in particular the problem that the actuating force would have to be corrected after reaching the synchronizing position in order to compensate for an incorrect choice in the speed of the actuating movement.

As shown in the flowchart of FIG. 6 which illustrates a preferred embodiment of the invention, the force that opposes the actuator drive force is estimated in step 601 by observing the speed of the drive mechanism, and the estimated opposing force is used to prescribe the control target for the actuating force. In accordance with the yes/no test in step 602 and the branch through step 604, the calculation of the target force is repeated until either the desired synchronization force $F_{sync}$ is sufficiently close to the estimated opposing force $F_1$ in accordance with the inequality $|F_{sync}-F_1| F_{limit}$, or the actuator drive speed $|v_i|$ falls below a limit $v_{limit}$. If either of these conditions has been met, the conditions for exiting from the loop are set in step 603 by setting the target force $F_i^{target}$ for the next pass equal to the desired synchronization force $F_{sync}$.

According to a further preferred embodiment of the invention, an artificial damping component is built into the driving force for the movement into the synchronizing position. Starting from the position shown in FIG. 2A, the movement into the synchronizing position and the build-up of the synchronization force is performed through a force-based type of control, wherein the target amount $F_i^{target}$ for the actuating force is set according to the equation $F_i^{target}=F_{max}-kv_i$. The force $F_{max}$ conforms to the equation $F_{max}=F_{sync}/\eta+F_{offset}$, wherein $F_{sync}$ stands for the desired synchronization force acting on the sliding sleeve, $\eta$ stands for the efficiency factor of the actuator drive, $v_i$ stands for the speed of the movement towards the synchronization threshold, and $F_{offset}$ and k are parameters. In this embodiment, the desired synchronization force is likewise attained rapidly and without overshooting, if the parameter k (also referred to as damping constant) is selected appropriately and matched to the other quantities used in the calculation.

In transmissions where the different gear ratios are engaged by means of shift clutches, it is necessary to enter position data such as the fully engaged positions or the synchronization thresholds in a memory device that is part of the control device, in order to ensure that the shifts will run smoothly. The operating conditions of the transmission can cause changes in the kinematic coupling between the sliding sleeve and the drive source, for example as a result of wear, leading to deviations between the stored position data and the actual positions, so that it becomes necessary to adapt the position data to the changes. An adaptation is preferably performed at repeated intervals during operation. Certain positions are connected to each other, meaning that a change due to operational factors affects the interrelated positions to the same degree, or there is at least a proportional relationship.

According to an embodiment of the invention, different positions are coupled to each other at least part of the time, so that the adaptation of one position is also used to correct another position. For example, the adaptation of the fully engaged end positions of the gears can be coupled to the adaptation of the synchronization threshold positions, so that after an end position of a gear ratio has been adapted, the respective synchronization threshold position is corrected accordingly. As a practical point, the coupling of the positions is not permanent, but is effective only at certain times. As an example, the positions for an adaptation can be coupled to each other after a predetermined time period. A practical time span for this is in the range from 40 to 200 hours, in particular 80 to 100 hours. However, in another embodiment it may also be opportune to couple the positions together more often, for example once every few hours, or several times an hour. In yet another embodiment, the time after which the positions are coupled to each other depends on the number of adaptations that have been performed on the engaged end positions. The coupling of the positions occurs advantageously after a predetermined number of adaptations of the engaged end positions, for example after 15 to 80 adaptations, and particularly after 40 to 60 adaptations. It can also be appropriate to couple positions for a combined adaptation on the basis of other events such as vehicle starts, or a stand-still condition of the vehicle at a traffic light.

According to a further concept of the present invention, an electromechanical energy converter is connected to the transmission of the vehicle. The rotor of the electromechanical energy converter is coupled for example to a flywheel or is in itself formed as a flywheel that can be advantageously disconnected from the combustion engine as well as from the drive shaft and used as an inertial storage device for kinetic energy, so that hybrid drive systems can be realized through these inventive arrangements under the scope of the present invention. In an embodiment of this kind, the transmission allows a comprehensive utilization of the electromechanical energy converter, for example as a starter unit for the combustion engine, as an electric generator, as a partial, i.e., assisting propulsion source, or as a full propulsion source for the vehicle, and also as a means for converting the kinetic energy of the traveling vehicle into electrical energy or into kinetic flywheel energy of the inertial rotor mass during deceleration phases where the combustion engine is uncoupled from the drive train. The latter operating concept is also referred to as energy recovery mode.

The patent claims submitted with the application are proposed formulations without prejudice to obtaining further patent protection. The applicant reserves the right to claim additional combinations of characterizing features that up to now have been disclosed only in the description and/or the drawings.

References used in the sub-claims refer to the further development of the object of the main claim through the characterizing features of that sub-claim; they are not to be understood as a waiver to obtaining independent protection for the combination of characterizing features contained in the referenced sub-claims.

Because the objects of the sub-claims with respect to the state of the art on the priority date can represent separate and independent inventions, the applicant reserves the right to make them the object of independent claims or divisional patent applications. They may also contain separate inventions, the form of which is independent of the subjects of the preceding sub-claims.

The exemplary embodiments are not to be understood as a limitation of the invention. Rather, numerous changes and modifications are possible within the scope of the present disclosure, especially such variants, elements, combinations and/or materials as a person skilled in the art can deduce, for example by combining or modifying individual features, elements or method steps presented in the general description and in the individual embodiments as well as in the claims and drawings, with a view to solving a specific problem, and which by way of a feature combination lead to a new subject or to new method steps or sequences of method steps, to the extent that they involve production, testing, and working processes.

What is claimed is:

1. A motor vehicle comprising an engine, a torque-transmitting device with a first actuating device, a transmission with a second actuating device and gears mounted on rotary shafts, and a control device for controlling said first and second actuating devices; said gears being arranged as gear pairs representing different transmission ratios, each gear pair comprising a fixed gear permanently coupled to one of said shafts and a free gear that can be selectively coupled to and uncoupled from another of said shafts; said control device having a first operating mode in which said first and second actuating devices are activated automatically by the control device based on a plurality of input quantities, and a second operating mode in which the first and second actuating devices are activated through an input given by a driver of the motor vehicle; said second actuating device comprising at least one actuator output element with a synchronizing device, wherein for at least one of said gear pairs said coupling of the free gear is performed by moving the at least one actuator element into a synchronization threshold position and applying a synchronizing force to the at least one actuator output element, wherein further the synchronizing device forestalls said coupling of the free gear until an at least approximate match has been established between respective rpm-rates of the free gear and of said other of the shafts, and wherein said move into the threshold position and said matching of rpm-rates is performed by controlling an actuating force that drives the actuator output element, wherein an adaptation of the synchronization threshold position is performed under the conditions that
 the motor vehicle is at least close to standing still,
 the engine is running,
 a vehicle brake is applied, and
 a request is present to adapt the synchronization threshold position.

2. A motor vehicle comprising an engine, a torque-transmitting device with a first actuating device, a transmission with a second actuating device and gears mounted on rotary shafts, and a control device for controlling said first and second actuating devices; said gears being arranged as gear pairs representing different transmission ratios, each gear pair comprising a fixed gear permanently coupled to one of said shafts and a free gear that can be selectively coupled to and uncoupled from another of said shafts; said control device having a first operating mode in which said first and second actuating devices are activated automatically by the control device based on a plurality of input quantities, and a second operating mode in which the first and second actuating devices are activated through an input given by a driver of the motor vehicle; said second actuating device comprising at least one actuator output element with a synchronizing device, wherein for at least one of said gear pairs said coupling of the free gear is performed by applying a synchronizing force to the at least one actuator output element, wherein further the synchronizing device forestalls said coupling of the free gear and remains in a synchronization threshold position until an at least approximate match has been established between respective rpm-rates of the free gear and of said other of the shafts, and wherein said synchronization threshold position is stored in a memory of the control device, wherein the synchronization threshold position is adaptable, wherein the second actuating device comprises means for selecting and actuating the actuator output elements, and wherein the adaptation of the synchronization threshold position comprises:

engaging the torque-transmitting device by means of the first actuating device;

moving the second actuating device at least close to a position from which the actuator output element of a gear pair can be actuated whose synchronization threshold position is to be adapted;

beginning at a starting point from which the synchronization threshold position will with certainty be traversed, moving the second actuating device so that the actuator output element is moved in a direction towards a final engaged position; and detecting the synchronization threshold position based on a resistance that is encountered by the actuator output element in its movement towards engagement, which is due to said forestalled condition.

3. The motor vehicle of claim 2, wherein the adaptation of the synchronization threshold position further comprises:

mathematical processing of the detected synchronization threshold position by means of an arithmetic unit associated with the control device, and using the detected and mathematically processed threshold position directly, or determining a new synchronization threshold position based on the detected and mathematically processed threshold position and an old synchronization threshold position.

4. A motor vehicle comprising an engine, a torque-transmitting device with a first actuating device, a transmission with a second actuating device and gears mounted on rotary shafts, and a control device for controlling said first and second actuating devices; said gears being arranged as gear pairs representing different transmission ratios, each gear pair comprising a fixed gear permanently coupled to one of said shafts and a free gear that can be selectively coupled to and uncoupled from another of said shafts; said control device having a first operating mode in which said first and second actuating devices are activated automatically by the control device based on a plurality of input quantities, and a second operating mode in which the first and second actuating devices are activated through an input given by a driver of the motor vehicle; said second actuating device comprising at least one actuator output element with a synchronizing device, wherein for at least one of said gear pairs said coupling of the free gear is performed by applying a synchronizing force to the at least one actuator output element, wherein further the synchronizing device forestalls said coupling of the free gear and remains in a synchronization threshold position until an at least approximate match has been established between respective rpm-rates of the free gear and of said other of the shafts, and wherein said synchronization threshold position is stored in a memory of the control device, wherein the synchronization threshold position is adaptable, wherein the actuator output element has a final engaged position corresponding to the coupled condition of the free gear, wherein end position data for the final engaged position are stored in a memory device associated with the control device and are adapted during operation of the vehicle, and wherein the adaptation of the synchronization threshold position is performed at least part of the time based on adapted end position data.

5. The vehicle of claim 4, wherein the synchronization threshold position is determined on the basis of said adapted end position data at least once after a predetermined time period has elapsed.

6. The motor vehicle of claim 5, wherein said predetermined time period is between 40 and 200 hours.

7. The motor vehicle of claim 6, wherein said predetermined time period is between 80 and 120 hours.

8. The motor vehicle of claim 4, wherein the synchronization threshold position is determined on the basis of said adapted end position data at least once after a predetermined number of independent adaptation processes have been performed.

9. The motor vehicle of claim 8, wherein said predetermined number is between 15 and 80.

10. The motor vehicle of claim 9, wherein said predetermined number is between 40 and 60.

11. A motor vehicle comprising an engine, a torque-transmitting device with a first actuating device, a transmission with a second actuating device and gears mounted on rotary shafts, and a control device for controlling said first and second actuating devices; said gears being arranged as gear pairs representing different transmission ratios, each gear pair comprising a fixed gear permanently coupled to one of said shafts and a free gear that can be selectively coupled to and uncoupled from another of said shafts; said control device having a first operating mode in which said first and second actuating devices are activated automatically by the control device based on a plurality of input quantities, and a second operating mode in which the first and second actuating devices are activated through an input given by a driver of the motor vehicle; said second actuating device comprising at least one actuator output element with a synchronizing device, wherein for at least one of said gear pairs said coupling of the free gear is performed by applying a synchronizing force to the at least one actuator output element, wherein further the synchronizing device forestalls said coupling of the free gear until an at least approximate match has been established between respective rpm-rates of the free gear and of said other of the shafts, and wherein the move of the actuator output element towards the synchronization threshold as well as the synchronization process itself are performed by controlling the force that drives the movement, wherein said control of the force that drives the movement is based on an estimate a reactive force that opposes the movement.

12. The motor vehicle of claim 11, wherein said estimate is based on a velocity, a kinetic energy, and a spring property of the second actuating device.

13. The motor vehicle of claim 12, wherein the spring property is expressed as a force/displacement characteristic.

14. The motor vehicle of claim 11, wherein said estimate is based on the energy-conservation principle as applied to an amount of work performed by a drive source of the second actuating mechanism.

15. A motor vehicle comprising an engine, a torque-transmitting device with a first actuating device, a transmission with a second actuating device and gears mounted on rotary shafts, and a control device for controlling said first and second actuating devices; said gears being arranged as gear pairs representing different transmission ratios, each gear pair comprising a fixed gear permanently coupled to one of said shafts and a free gear that can be selectively coupled to and uncoupled from another of said shafts; said control device having a first operating mode in which said first and second actuating devices are activated automatically by the control device based on a plurality of input quantities, and a second operating mode in which the first and second actuating devices are activated through an input given by a driver of the motor vehicle; said second actuating device comprising at least one actuator output element with a synchronizing device, wherein for at least one of said gear pairs said coupling of the free gear is performed by moving the at least one actuator element into a synchronization threshold position and applying a synchronizing force to the at least one actuator output element, wherein further the synchronizing device forestalls said coupling of the free gear until an at least approximate match has been established between respective rpm-rates of the free gear and of said other of the shafts, and wherein said move into the threshold position and said matching of rpm-rates is performed by controlling an actuating force that drives the actuator output element, wherein said control of the force that drives the actuator output element is based on an estimate a reactive force that opposes the actuator output element.

16. The motor vehicle of claim 15, wherein said estimate is based on the energy-conservation principle as applied to an amount of work performed by a drive source of the second actuating mechanism.

17. A motor vehicle transmission with a plurality of rotary shafts and gear pairs forming different transmission ratios, each gear pair comprising a fixed gear permanently coupled to one of said shafts and a free gear that meshes with the fixed gear and can be selectively coupled to and uncoupled from another of said shafts; wherein the transmission comprises:

sliding sleeves operable to engage and disengage the free gear of one of said gear pairs with said other of the shafts, driving means operable to drive a sliding movement of the sliding sleeves to establish said engagement and disengagement, a mechanism for coupling the driving means to the sliding sleeves, at least one elastic element associated with the mechanism and operable to convert kinetic energy into potential energy, to store said potential energy, and to subsequently release said potential energy in the form of kinetic energy, and a control device for controlling said driving means, wherein the control device uses a target value for a force to push the sliding sleeves into engagement, and wherein said target value is based on a velocity of said sliding movement and on a degree of elasticity of said at least one elastic element.

18. The transmission of claim 17, comprising synchronization devices arranged between the sliding sleeves and the free gears and operable to block said sliding movement at an engagement threshold position and to prevent a complete, form-locking engagement between the sliding sleeve and the free gear until at least an approximate match of rpm-rates has been achieved between the sliding sleeve and said other of the shafts, wherein due to said blockage, kinetic energy is converted to and stored in the form of potential energy, and wherein at the point of said blockage, the gradient of the potential energy is at least approximately equal to said target value.

19. The transmission of claim 18, wherein the velocity of the sliding movement is selected dependent on a force/displacement characteristic of the at least one elastic element, and wherein said potential energy consists of elastic energy stored in the at least one elastic element.

20. The transmission of claim 18, wherein a force/displacement characteristic of the at least one elastic element is selected dependent on the velocity of the sliding movement, and wherein said potential energy consists of elastic energy stored in the at least one elastic element.

21. The transmission of claim 18, wherein the at least one elastic element behaves elastically above a threshold force and non-elastically below a threshold force, and wherein said threshold force is smaller than an amount of force acting on any of the sliding sleeves during said blockage.

22. The transmission of claim 21, wherein the threshold force lies between 50 N and 450 N.

23. The transmission of claim 21, wherein the threshold force lies between 200 N and 600 N.

24. The transmission of claim 21, wherein the threshold force lies between 400 N and 1000 N.

25. The transmission of claim 21, wherein the threshold force lies between 150 N and 350 N.

* * * * *